US006192038B1

(12) United States Patent
Wallerius et al.

(10) Patent No.: US 6,192,038 B1
(45) Date of Patent: *Feb. 20, 2001

(54) METHOD AND APPARATUS FOR WIRELESS COMMUNICATION EMPLOYING AGGREGATION FOR DIGITAL SIGNALS

(75) Inventors: John Walker Wallerius, Fremont; Andrew John Walters, Mountain View; John Andrew Vastano, Palo Alto, all of CA (US)

(73) Assignee: mDiversity Inc., San Jose, CA (US)

( * ) Notice: Under 35 U.S.C. 154(b), the term of this patent shall be extended for 0 days.

This patent is subject to a terminal disclaimer.

(21) Appl. No.: 08/801,711

(22) Filed: Feb. 14, 1997

Related U.S. Application Data

(63) Continuation-in-part of application No. 08/544,913, filed on Oct. 18, 1995, now Pat. No. 5,715,516, which is a continuation-in-part of application No. 08/634,141, filed on Apr. 19, 1996, now Pat. No. 5,805,576.

(51) Int. Cl.[7] .................................................. H04Q 7/00

(52) U.S. Cl. .......................................... 370/328; 455/422

(58) Field of Search ................................ 370/328, 332, 370/337, 329, 341, 347, 431, 333, 334; 455/132–141, 422, 509, 517, 519

(56) References Cited

U.S. PATENT DOCUMENTS

| 4,797,947 | 1/1989 | Labedz . |
| 5,168,502 | 12/1992 | Millet . |
| 5,233,643 | 8/1993 | Nacini et al. . |
| 5,530,725 | * 6/1996 | Koch .................................... 375/347 |
| 5,537,683 | 7/1996 | Hill et al. . |
| 5,539,749 | 7/1996 | Eul . |
| 5,548,806 | 8/1996 | Yamaguchi et al. . |
| 5,740,526 | * 4/1998 | Bonta et al. ....................... 455/277.2 |

FOREIGN PATENT DOCUMENTS

| 0673177 | 9/1995 | (EP) . |
| 93 12590 | 6/1993 | (WO) . |
| 93 14579 | 7/1993 | (WO) . |
| 94 26074 | 11/1994 | (WO) . |
| 94 27161 | 11/1994 | (WO) . |

OTHER PUBLICATIONS

Oppenheim et al., "Digital Signal Processing," Prentice–Hall, Inc., New Jersey, pp. 358–366.

Desplanches, S. Buljore and J.F. Diouris, "Complexity Reduction for a Multisensor Viterbi Equaliser" *Electronic Letters*, Jan. 18, 1996, vol. 32, No. 2, pp. 91–92.

G. Bottomley and K. Jamal, "Adaptive Arrays and MLSE Equalization", Proceedings of the $45^{th}$ Vehicle Technology Conference, 1995, vol. 1 pp. 50–54.

G. David Forney, Jr., "Maximum–Likelihood Sequence Estimation of Digital Sequences in the Presence of Intersymbol Interference," IEEE Transactions on Information Theory, vol. IT–18, No. 3, May 1972, pp. 363–378.

Richard O. Duda and Peter E. Hart, "Pattern Classification and Scene Analysis,"πJohn Wiley & Sons, pp. 114–126.

(List continued on next page.)

*Primary Examiner*—Ajit Patel
(74) *Attorney, Agent, or Firm*—David E. Lovejoy

(57) ABSTRACT

A communication system having a plurality of forward channel communications and a plurality of corresponding reverse channel communications from and to a plurality of mobile users. A plurality of collectors are distributed at macro-diverse locations for receiving reverse channel signals from the users. Each of the collectors includes micro-diversity receivers for receiving the reverse channel signals from users. The collectors process and forward the reverse channel signals to aggregators. The aggregators combine the reverse channel signals to yield a combined signal with fewer bit errors than occur in the absence of combining.

66 Claims, 11 Drawing Sheets

OTHER PUBLICATIONS

J. Hagenauer and P. Hoeher, "A Viterbi Algorithm with Soft–Decision Outputs and its Applications" Proceedings of GLOBECOM '89, No. 47, vol. 1 pp. 1680–1686, 1989.

Ronald E. Crochiere and Lawrence R. Rabiner, "Multirate Digital Signal Processing," Basic Principles of Sampling and Sampling Rate Conversion, Prentice–Hall, Inc., 1983, pp. 48–58.

* cited by examiner

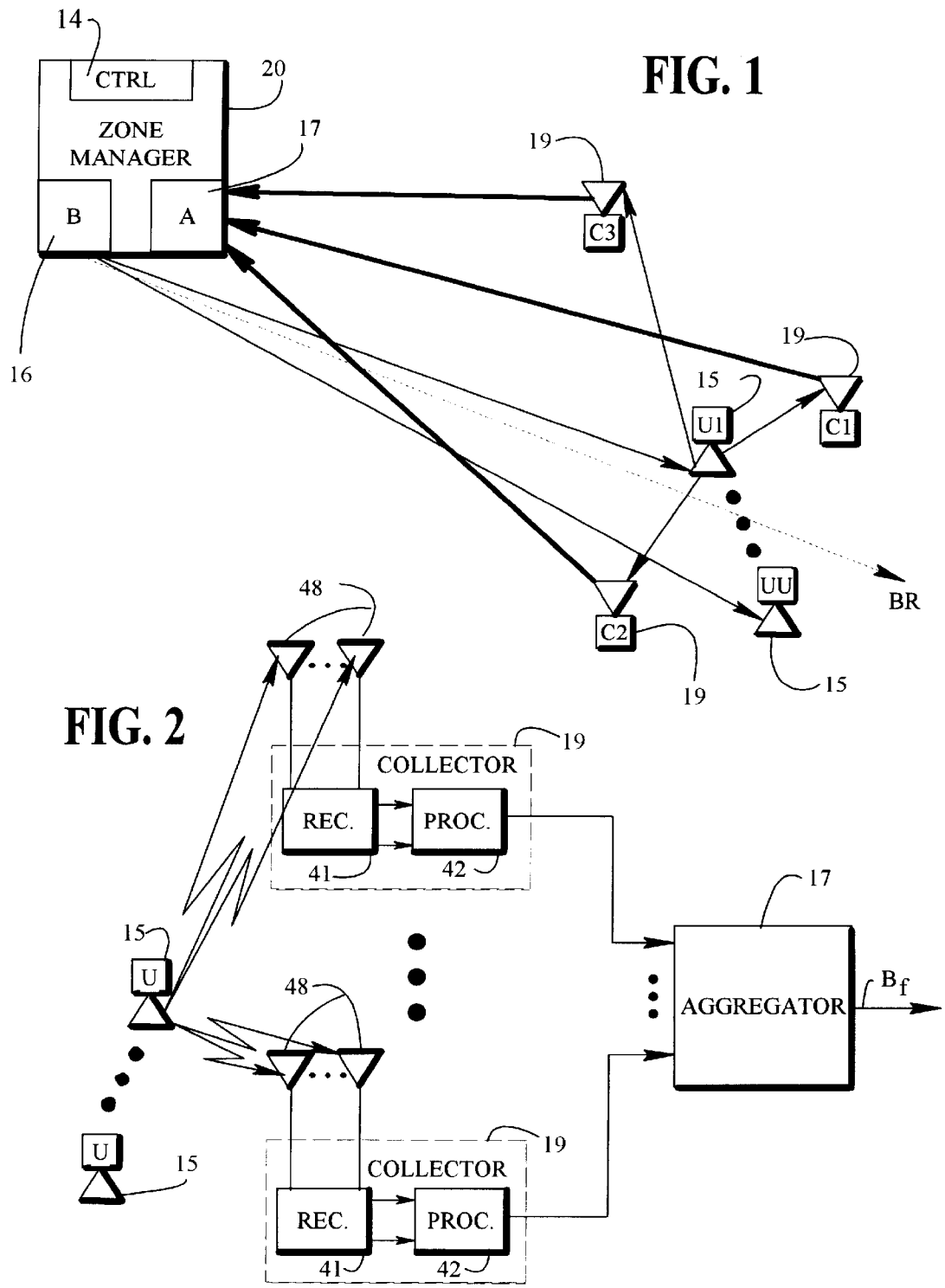

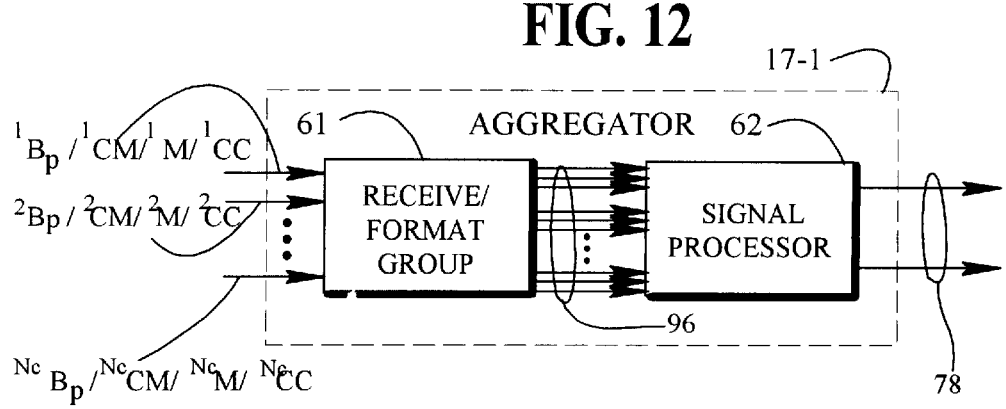
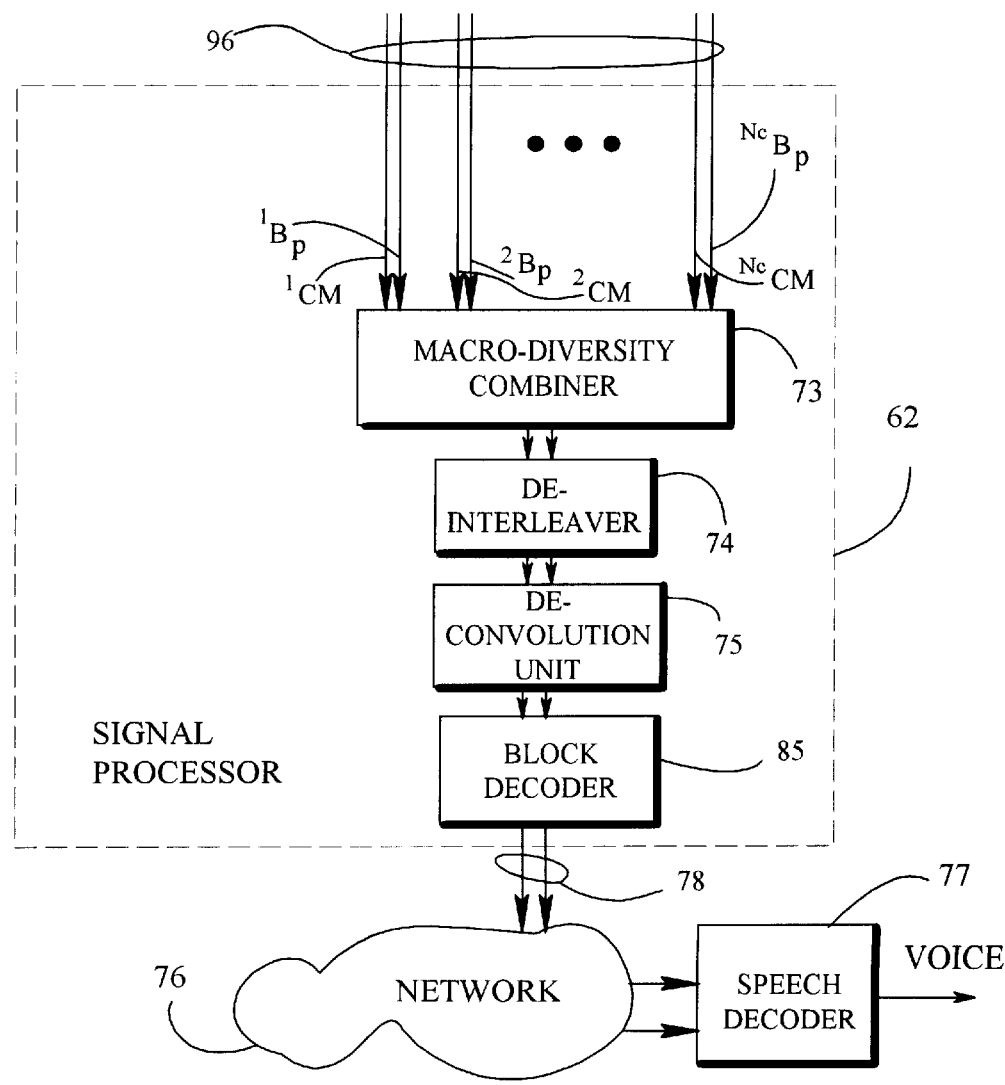

FIG. 17
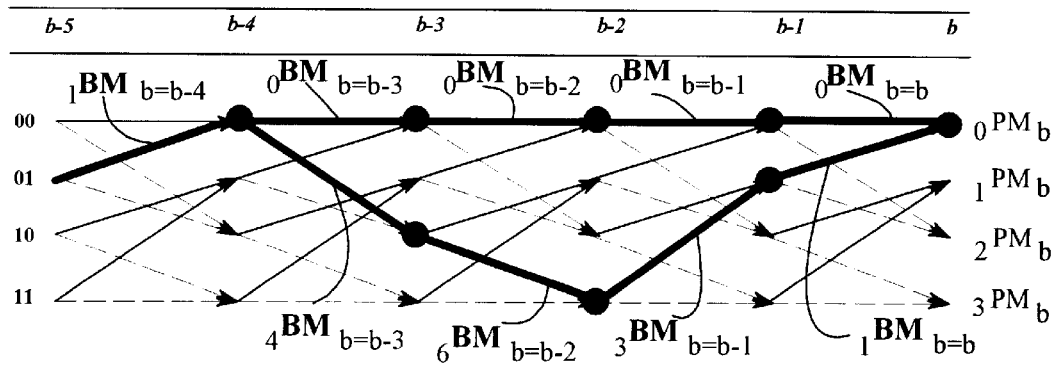
FIG. 18
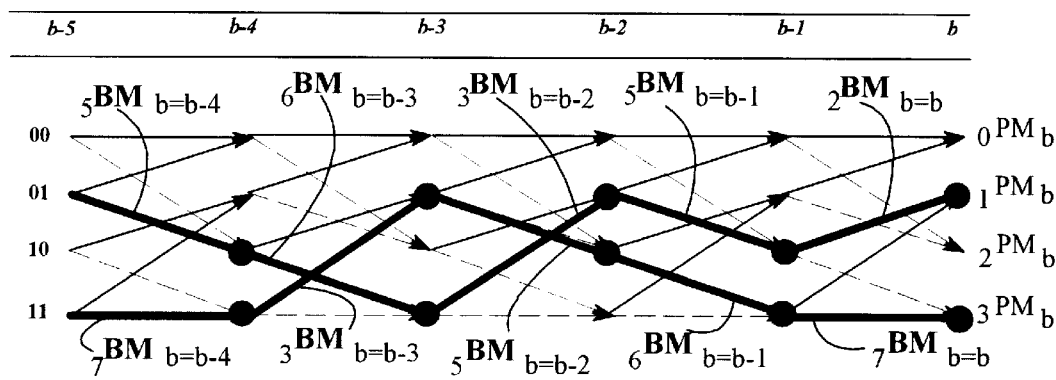
FIG. 19
|   | $TV_{b-4}$ | $TV_{b-3}$ | $TV_{b-2}$ | $TV_{b-1}$ | $TV_b$ |
|---|---|---|---|---|---|
| 0 | 1 | 0 | 0 | 0 | 0 |
| $_1TV$ | - | 1 | 1 | 1 | 0 |
| $_2TV$ | 1 | 0 | 1 | 1 | - |
| $_3TV$ | 1 | 0 | 0 | 0 | 1 |

|  | $b-4=57$ | $b-3=58$ | $b-2=59$ | $b-1=60$ | $b=61$ |
|---|---|---|---|---|---|
| $_0TV$ | <u>1</u> | 0 | 0 | 0 | <u>0</u> |
| $_1TV$ | - | 1 | 1 | <u>1</u> | 0 |
| $_2TV$ | 1 | <u>0</u> | 1 | 1 | - |
| $_3TV$ | 1 | 0 | <u>0</u> | 0 | 1 |

METHOD AND APPARATUS FOR WIRELESS COMMUNICATION EMPLOYING AGGREGATION FOR DIGITAL SIGNALS

CROSS REFERENCE

This application is a continuation-in-part of application SC/Ser. No. 08/544,913 filed Oct. 18, 1995 entitled METHOD AND APPARATUS FOR WIRELESS COMMUNICATION EMPLOYING COLLECTOR ARRAYS, assigned to the same assignee as this application now U.S. Pat. No. 5,715,516.

This application is a continuation-in-part of application SC/Ser. No. 08/634,141 filed April 19, 1996 entitled METHOD AND APPARATUS FOR TDMA WIRELESS COMMUNICATION EMPLOYING COLLECTOR ARRAYS FOR RANGE EXTENSION assigned to the same assignee as this application, now U.S. Pat. No. 5,805,576.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of two-way wireless communication systems and more specifically to methods and apparatus for communication with mobile telephone users (cellular and personal communication systems), basic exchange telecommunications radio, wireless data communications, two-way paging and other wireless systems.

Conventional Cellular Systems

Present day cellular mobile telephone systems developed due to a large demand for mobile services that could not be satisfied by earlier systems. Cellular systems "reuse" frequency within a group of cells to provide wireless two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the hand-off of users from cell to cell and thus typically from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

The base station in addition to providing RF connectivity to users also provides connectivity to a Mobile Telephone Switching Office (MTSO). In a typical cellular system, one or more MTSO's will be used over the covered region. Each MTSO can service a number of base stations and associated cells in the cellular system and supports switching operations for routing calls between other systems (such as the PSTN) and the cellular system or for routing calls within the cellular system.

Base stations are typically controlled from the MTSO by means of a Base Station Controller (BSC). The BSC assigns RF carriers to support calls, coordinates the handoff of mobile users between base stations, and monitors and reports on the status of base stations. The number of base stations controlled by a single MTSO depends upon the traffic at each base station, the cost of interconnection between the MTSO and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there may be a transfer period of time during which the forward and reverse communications to the mobile user are severed with the base station for the first cell and are not established with the second cell.

Conventional cellular implementations employ one of several techniques to reuse RF bandwidth from cell to cell over the cellular domain. The power received from a radio signal diminishes as the distance between transmitter and receiver increases. Conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere with the carrier in the given cell. The determination of how far away reuse sites must be and of what constitutes significant interference are implementation-specific details. The cellular Advanced Mobile Phone System (AMPS) currently in use in the United States employs FDMA communications between base stations and mobile cellular telephones.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods. The GSM and PCS1900 standards are examples of TDMA methods in current use.

In code division multiple access (CDMA) systems, multiple channels are defined using the same carrier and with simultaneous broadcasting. The transmissions employ coding schemes such that to a given channel on a given carrier, the power from all other channels on that carrier appears to be noise evenly distributed across the entire carrier bandwidth. One carrier may support many channels and carriers may be reused in every cell. Systems using the IS-95 standard are examples of CDMA methods in current use.

In space division multiple access (SDMA) systems, one carrier is reused several times over a cellular domain by use of adaptive or spot beam-forming antennas for either terrestrial or space-based transmitters.

TDMA Conventional Cellular Architectures

In TDMA systems, time is divided into time slots of a specified duration. Time slots are grouped into frames, and the homologous time slots in each frame are assigned to the same channel. It is common practice to refer to the set of homologous time slots over all frames as a time slot. Each logical channel is assigned a time slot or slots on a common carrier band. The radio transmissions carrying the communications over each logical channel are thus discontinuous. The radio transmitter is off during the time slots not allocated to it.

Each separate radio transmission, which should occupy a single time slot, is called a burst. Each TDMA implementation defines one or more burst structures. Typically, there are at least two burst structures, namely, a first one for the initial access and synchronization of a user to the system, and a second one for routine communications once a user has been synchronized. Strict timing must be maintained in TDMA systems to prevent the bursts comprising one logical channel from interfering with the bursts comprising other logical channels in the adjacent time slots. When bursts do not interfere, they are said to be isolated. Burst-to-burst isolation may be quantified in several ways. One measure is the minimum signal-to-interference ratio between the burst intended for a time slot and the bursts intended for the preceding and following time slots, said minimum ratio being taken over the information-carrying length of the burst in question. If this ratio never drops below an implementation-specific value, the burst is said to be isolated from the adjacent bursts. In the event that this safety margin is violated, another measure of isolation is the fraction of the total burst for which the margin is violated. This measure may be a weighted measure if the importance of data or the degree of coding protection afforded the data varies over the length of the burst. Data variation over the burst is typical in TDMA implementations.

Space Diversity

Combining signals from a single source that are received at multiple spaced-apart antennas is called space diversity. Micro-diversity is one form of space diversity that exists when two or more receiving antennas are located in close proximity to each other (within a distance of several meters for example) and where each antenna receives the signals from the single source. In micro-diversity systems, the received signals from the common source are processed and combined to form an improved quality resultant signal for that single source. Micro-diversity is effective against Rayleigh or Rician fading or similar disturbances. The terminology micro-diverse locations means, therefore, the locations of antennas that are close together and that are only separated enough to be effective against Rayleigh or Rician fading or similar disturbances.

Macro-diversity is another form of space diversity that exists when two or more receiving antennas are located far apart from each other (at a distance much greater than several meters, for example, ten kilometers) and where each antenna receives the signals from the single source. In macro-diversity systems, the received signals from the single source are processed and combined to form an improved quality resultant signal for that single source. The terminology macro-diversity means that the antennas are far enough apart to have decorrelation between the mean signal levels for signals from the single source. The terminology macro-diverse locations means, therefore, the locations of antennas that are far enough apart to achieve that decorrelation.

Shadow Fading

The decorrelation of mean signal levels employed in macro-diversity systems is due to local variability in the value of signal strength diminution to each of the spaced-apart receiving antennas. This local variability exists on length scales above Rayleigh or Rician fading and is due to terrain effects, signal blocking by structures or vegetation, and any other variability that exists in a particular environment. This variability is referred to as shadow fading. Decorrelation lengths for shadow fading may be as small as length scales just above Rayleigh fading length scales (for example, less than a few meters), or may be as large as several kilometers.

Maximum Likelihood Sequence Estimates (MLSE)

In order to improve signal quality in communication systems, many signal processing methods have been employed. For example, a method for providing soft equalizer outputs to a downstream decoder using a Maximum Likelihood Sequence Estimate (MLSE) algorithm is described in the article by J. Hagenauer and P. Hoeher, "A Viterbi algorithm with soft-decision outputs and its applications" Proceedings of GLOBECOM '89, No. 47, Vol. 1, pp. 1680–1686, 1989. In this article, a method is proposed for associating a confidence (that is, quality) metric with each bit output by an MLSE equalizer. The purpose of soft decisions is to provide additional information to a subsequent convolutional decoder.

The processing for the MLSE algorithm is bit by bit, on the input bit streams, forming a trellis of states. For every new trellis state, the surviving path into that state is decided based on which incoming path has the minimum distance. The difference between the two path lengths is a measure of the confidence in the decision as to which path survives. For example, if the two paths have equal distances, the decision as to which path survives is random, and confidence is very low. Large differences in distance correspond to high confidence that the surviving path decision is correct. The path decision implies a decision about which of two sequences of bits will be output. The confidence metric for the path decision is propagated back to all of the bits in the path. This propagation is done by locating all of the places where the bits of the winning path differ from the bits of the losing path. For all of these places, the confidence of the bit on the winning path is set to the minimum of whatever confidence value had previously been assigned to the bit, and the new confidence value, that is, the difference in distance between the winning and losing path. The trace back stops at the point where the two paths merge.

Multi-Sensor MLSE Algorithm

Microdiversity using a Multi-Sensor MLSE Algorithm (MSVA) is described in the articles by Desplanches, S. Buljore and J. F Diouris, "Complexity reduction for a multisensor Viterbi equaliser" Electronics Letters, Jan. 18, 1996, Vol. 32, No. 2, and by G. Bottomley and K. Jamal, "Adaptive Arrays and MISE Equalition", *Proceedings of the 45th Vehicle Technology Conference,* 1995, Vol. 1, pp. 50–54. The MSVA algorithm is a method for combining inputs from multiple antennas to obtain a maximum likelihood sequence estimate.

Signal Quality Enhancements

In order for diversity combining to increase the quality of a signal, some measure of the quality of the input signals must be generated. One of the difficult problems in designing space-diversity algorithms is finding an accurate measure of precombination decision reliability, which can be computed in real-time. While micro-diversity systems improve system quality by ameliorating the effects of Rayleigh fading, which is short-term in nature, they are not very effective in combatting shadow fading, which is caused by effects such as an obstruction coming between a transmitter and a receiving antenna. While macro-diversity systems combine received signals from a number of receivers spaced far apart in space to combat shadow fading, in order for macro-diversity combining to increase the quality of the resulting signal, some measure of the quality of the individual received signals is necessary. Methods based on signal power tend to fail in interference limited environments such as are commonly present in mobile communications.

In one prior art system, a method of merging data streams generated by a plurality of base stations in a cellular system was proposed where various streams of data from the base stations were proposed to be combined, at a unification point, based upon reliability information in order to improve the hand off of the mobile station user from one base station to another. Such a system, however, is hampered by the conventional architecture of conventional cellular systems where the users transmit on the reverse channel to base stations that have both the forward channel broadcasters and the reverse channel receivers co-sited and equal in number. With such a conventional architecture, the generally weaker link of the reverse channel is at a disadvantage and is a limiting factor for system performance.

In accordance with the above background, the communications problems resulting from interference environments create a need for improved wireless communication systems which overcome the interference problems and other limitations of conventional cellular systems.

SUMMARY OF THE INVENTION

The present invention is a communication system having a plurality of forward channel communications and a plurality of corresponding reverse channel communications from and to a plurality of mobile users. A plurality of collectors are distributed at macro-diverse locations for receiving reverse channel signals from the users. Each of the collectors typically includes micro-diversity receivers for receiving the reverse channel signals from users. The collectors forward these reverse channel signals to the aggregators. The aggregators combine the received signals from the macro-diverse collectors. The combining of multiple collector signals for the same user that are both macro-diverse and micro-diverse results in an output bit stream with fewer bit errors.

In one embodiment, the micro-diverse combining occurs in the collectors and the macro-diverse combining occurs in the aggregators. In an alternative embodiment, some or all of the micro-diverse combining occurs along with the macro-combining in the aggregators.

In the aggregation method using microdiversity at multiple macro-diverse collectors, the signals from users received at collector antennas are processed to yield one or more sequences of bits and corresponding one or more confidence metrics for each bit. Inputs from the same user through multiple micro-diverse antennas at each collector are combined to reduce errors resulting from Rayleigh and similar disturbances. Signals for the same user are processed to form sequences of bits and corresponding confidence metric vectors from multiple macro-diverse collectors are combined in an aggregator additionally to reduce errors resulting from shadow fading and similar disturbances. The aggregator processes the data from the multiple collectors and combines and decodes the resulting streams to reduce the probability of bit errors. The combining process utilizes the confidence metrics to make a final decision on each bit.

The demodulation and confidence metric generation at collectors in one embodiment is a software implementation of an algorithm that uses soft Maximum Likelihood Sequence Estimates (MLSE).

In one embodiment of the system, the number of collectors is greater than the number of broadcasters so that the forward channel geometry is different from the reverse channel geometry. With a geometry having greater density of collectors than broadcasters, the forward channel distance from broadcaster to user tends to be much greater than the reverse channel distance from that user to a collector. This geometry compensates for the reverse channel weaker operation arising from the lower-power, lower-antenna-height of the user when compared with the forward channel stronger operation arising from the higher-power, higher-antenna-height of the broadcaster. Unlike conventional cellular architectures where the limiting factor in cell size and service is the transmitter range of the user transceiver, the present invention makes larger cells possible with a higher quality of service because of the improved reverse channel operation.

The foregoing and other objects, features and advantages of the invention will be apparent from the following detailed description in conjunction with the drawings.

BRIEF DESCRIPTION OF THE DRAWINGS

FIG. 1 depicts a communication system for wireless users, each user transmitting user signals to a plurality of collectors that in turn forward the user signals for each user to an aggregator for combining.

FIG. 2 depicts the reverse channel communication structure for the FIG. 1 system.

FIG. 12 depicts a representation of an aggregator.

FIG. 13 depicts a detailed representation of an embodiment of the aggregator of FIG. 12.

FIG. 17 depicts one view of six sequential stages of an MSLE trellis state diagram of the FIG. 16 type.

FIG. 18 depicts another view of six sequential stages of an MSLE trellis state diagram of the FIG. 16 type.

FIG. 19 depicts a view of the trace vectors derived from the FIG. 17 and FIG. 18 state diagrams.

DETAILED DESCRIPTION

Cellular System With Multiple Collectors—FIG. 1

Figure 3:
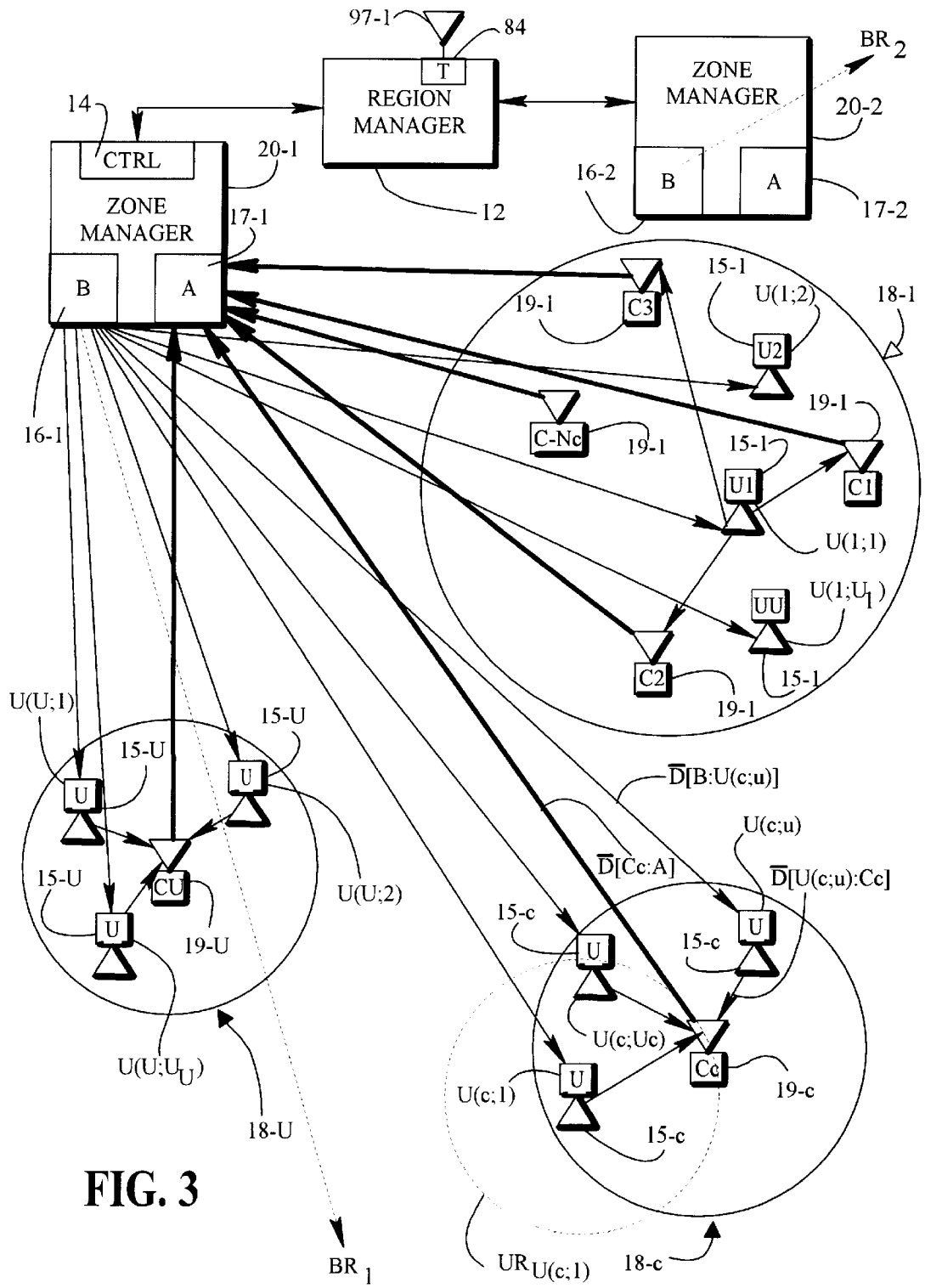
FIG. 3 depicts a communication system for wireless users with multiple collectors per broadcaster zone for wireless users in multiple broadcaster zones.

In FIG. 1, a cellular system is shown having zones with multiple collectors 19 for wireless communication with multiple users 15. In the system, one zone manager (ZM) 20 includes an RF broadcaster (B) 16 that establishes a broadcast range, BR, for broadcasting forward channel transmissions to a plurality of users 15 (mobile cellular phones or mobile stations) in a zone defined by the range, BR.

Each of the users 15 has a receiver antenna for receiving broadcasts on the forward channel from the broadcaster 16 of zone manager 20. Also, each of the users 15 has a transmitter that transmits on a reverse channel establishing, for each user, a user range (UR) that in general covers a more limited range than that covered by the broadcaster range, BR.

In the FIG. 1 embodiment, the users 15 are located in close proximity to plurality of collectors 19. Each collector array 19, in addition to receiving the reverse channel communications from users 15, also has forwarding means, such as a transmitter, for forwarding the reverse channel communications to an aggregator (A) 17 of the zone manager 20. Each of the collectors 19 in FIG. 1 is sited at a macrodiverse location relative to the other collectors 19. The sites of collectors 19 may be within the range BR or may be beyond the range BR but within the range of users 15 that are in the range BR. In either case, the collectors 19 are in proximity to the broadcasting zone established by BR. The distances from the broadcaster 16 and the aggregator 17 to the collectors 19 may be arbitraily large. The broadcaster 16 and the aggregator 17 may or may not be co-sited.

In FIG. 1, the users 15 each communicates over a reverse channel to each of the collectors 19. One or more of the collectors 19 in turn continues the reverse channel for each user 15 by forwarding collector signals with the user reverse channel information back to the aggregator 17. In this manner, multiple copies of macro-diverse reverse channel communications are received at the aggregator 17 for each user. In FIG. 1, the communication paths for the reverse channel are only shown for one user for clarity of explanation. However, each of the other users in a similar manner communicates on a reverse channel to the plurality of collectors 19.

Reverse Channel Communication—FIG. 2

In FIG. 2, the collectors 19 of FIG. 1 are at macro-diverse locations. Each collector 19 includes microdiversity antennas 48 where each antenna 48 receives reverse channel user signals from the same user. In each collector, a receiver 41 receives reverse channel user signals from the same user. In each collector, a receiver 41 receives the micro-diversity signals from antennas 48 and connects them to the signal processor 42. The signal processor 42 processes the micro-diversity signals to form sequences of data bits and corresponding confidence metrics based upon diversity processing. Each macro-diversity collector 19 forwards the data bits and confidence metrics for the same user (resulting from micro-diversity processing) to the aggregator 17. Aggregator 17 combines the macrodiverse collector signals from the same user to provide a final sequence of data bits (resulting from both micro-diversity and macro-diversity processing) representing the user signal.

Cellular System Having Zones With Multiple Collectors—FIG. 3

In FIG. 3, a cellular system is shown having multiple zones like the zone of FIG. 1 with multiple collectors 19 for wireless communication with multiple users 15. In the system, one zone manager (ZM) 20-1 includes an RF broadcaster (B) 16-1 that establishes a broadcast range, $BR_1$, for broadcasting forward channel transmissions to a plurality of users 15-1 (mobile cellular phones or mobile stations) in a first zone defined by the range of $BR_1$. In a similar manner, one or more other zone managers exist of which zone manager (ZM) 20-2 is typical and which includes a broadcaster (B) 16-2 that establishes a broadcast range, $BR_2$, for broadcasting forward channel transmissions to a plurality of users in a second zone defined by the range $BR_2$. The zone managers 20-1 and 20-2 of FIG. 3, typical of a plurality of zone managers 20, are controlled by a region manager 12. The details concerning the structure and operation of the region manager 12 are described in the above-identified cross-referenced application entitled METHOD AND APPARATUS FOR TDMA WIRELESS COMMUNICATION EMPLOYING COLLECTOR ARRAYS FOR RANGE EXTENSION.

The region manager 12, in one embodiment, includes a master time transmitter 84 that transmits a time synchronization signal through antenna 97-1. Alternatively, a master time signal can be available at any sites from other sources such as a global positioning system (GPS). The time synchronization signal is used to synchronize the collector signals for the plurality of collectors that are associated with each user (mobile station).

In the FIG. 1 and FIG. 3 systems, one preferred mode uses TDMA communication although other modes of multiple access including CDMA and SDMA are within the scope of the present invention.

In FIG. 3, the zone manager 201 and broadcaster 16-1 establish the broadcast range, $BR_1$, for broadcasting forward channel transmissions to a plurality of users in user groups 18-1, . . . , 18-c, . . . , 18-U that are within the broadcast zone. The user group 18-1 includes users 15-1 designated U(1;1), U(1;2), . . . , U(1;$U_1$), the user group 18-c includes users 15-c designated U(c;1), . . . , U(c;u), . . . , U(c;$U_c$), and the user group 18-U includes users 15-U designated U(U;1), U(U;2), . . . , U(U;$U_U$). Each of the users of user groups 18-1, . . . , 18-c, . . . , 18-U (hereinafter sometimes referred to as users 15 ) has a receiver antenna for receiving broadcasts on the forward channel from the broadcaster 16-1 of zone manager 20-1. Also, each of the users 15 has a transmitter that transmits on a reverse channel establishing, for each user, a user range (UR) that in general covers a more limited range than that covered by the broadcaster range, BR. In FIG. 3, the user range, $UR_{U(c;1)}$, is shown for user U(c;1).

In one embodiment, the users of group 18-1 are located in close proximity to a C1 collector array 19-1, the users of group 18-c are located in close proximity to a Cc collector array 19-c, and the users of group 18-U are located in close proximity to a CU collector array 19-U. The collector arrays 19-1, . . . , 19-c, . . . , 19-U (each generally identified as a collector array 19) have receiver antennas for receiving transmissions from users 15. Each collector array 19, in addition to receiving the reverse channel communications from users 15, also has forwarding means, such as a transmitter, for forwarding the reverse channel communications to an aggregator (A) 17-1 of the zone manager 20-1. While each of the collector arrays 19 in FIG. 3 can be a single element (collector) sited at a single location, they preferably are multiple elements (collectors) sited at different locations. The sites of collectors 19 may be within the range $BR_1$ or may be beyond the range $BR_1$ but within the range of users 18 that are in the range $BR_1$. In either case, the collector arrays 19 are in proximity to the broadcasting zone established by $BR_1$. The distances from the broadcaster 16-1 and the aggregator 17-1 to the collectors 19 may be arbitrarily large. The broadcaster 16-1 and the aggregator 17-1 may or may not be co-sited.

In FIG. 3, the collector array 19-1 includes, for example, the Nc collectors C1, C2, C3, . . . , C-Nc that are distributed over a local area and are at spaced-apart locations to achieve macro-diversity. In general, each user 18 communicates with a plurality of different collectors 19. At any point in time, the control 14 in zone manager 20-1 may select which users are communicating through which collectors. The zone manager 20-1 and or the region manager 2 includes a computer and computer memory for example that stores this selection as a collector group. From time to time, control 14 may change the collector group for any particular user in order to maintain system performance.

In FIG. 3, the users U(1;1); U(1;2); . . . ; U(1;$U_1$) each communicates over a reverse channel to each of the collectors C1, . . . , C-Nc. One or more of the collectors C 1, . . . , C-Nc in turn continues the reverse channel for each user 15-1 back to the aggregator 17-1 in the zone manager 20-1. In this manner, multiple copies of the reverse channel communications are received at the aggregator 17-1 for each user. In FIG. 3, the communication paths for the reverse channel to the aggregate 17-1 are only shown for the U1 user U(1;1). However, each of the other users 18-1 in a similar manner communicates on a reverse channel to the plurality of collectors C1, . . . , C-Nc.

In FIG. 3, more than one collector is used for a group of users and therefore the optimal choice of user time advancement or delay is optimized for this environment. Also, users are generally mobile, and thus user location and the various radio signal travel times between system components change in time. The synchronization process, therefore, is repeated as needed based on criteria determined by the zone manager 20-1 or region manager 12, or may be routinely performed at times set by a system operator with regard to the expected velocities for users. The timing requirements for multiple users at multiple collectors are described in the above cross-referenced applications. User groups may be formed and reformed as users move such that synchronized communications are maintained. The zone manager 20-1 and or the region manager 12 includes a computer and computer memory for example that stores the identity of users as user groups. The user groups in FIG. 3 operate, for example, with a TDMA protocol where the users 15 are assigned time slots (TS) within a common frequency band.

In operation of the FIG. 3 system, digital RF signals are received from users 15 at antennas of collectors 19 and these received signals are processed to yield a sequence of bits. When a collector 19 demodulates the digital signal from a user 15 to detect the received signal bits, the collector also makes measurements which are operated on algorithmically to provide an estimate of quality of each received signal bit, that is, an estimate of the probabilistic reliability of each logical 1 or logical 0 bit decision for each bit. The estimate of quality results in a confidence metric for each bit. The processing involves combining inputs from two or more micro-diverse antennas located at the same collector to reduce errors resulting from Rayleigh fading or similar disturbance. Further, confidence metrics from multiple macrodiverse collectors 19 are forwarded to an aggregator 17 and are combined to further reduce errors from shadow fading or similar disturbance.

In the FIG. 3 system, the number of collectors 19 designated as $N_c$ is greater than the number of broadcasters 16 designated as $N_{bm}$ so that the forward channel geometry is different from the reverse channel geometry. With a greater density of collectors than broadcasters, the forward channel distance, for example, the distance $\overline{D}[B:U(c;u)]$ from broadcaster 16-1 to user 15-c, U(c;u), tends to be much greater than the reverse channel distance $\overline{D}[U(c;u):Cc]$ from that user 15-c to collector 19-c. Accordingly, the reverse channel operation is better optimized.

Figure 4:
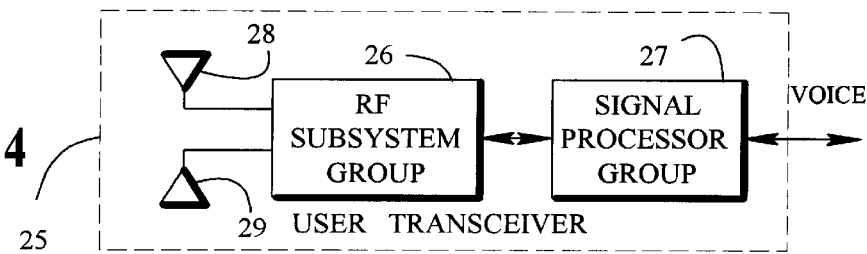
FIG. 4 depicts a representation of a user transceiver.
Figure 5:
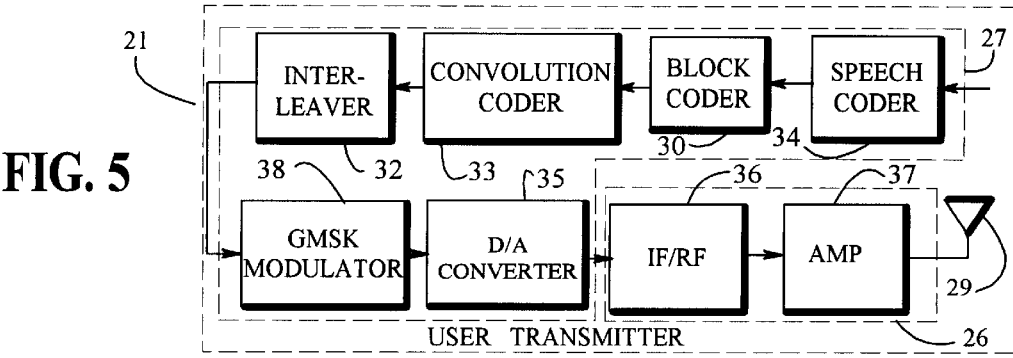
FIG. 5 depicts a more detailed representation of a user transmitter portion of the user transceiver of FIG. 4.
Figure 6:
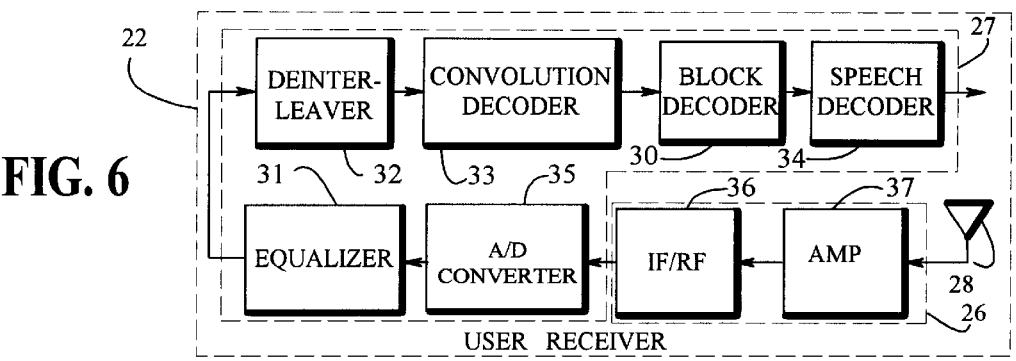
FIG. 6 depicts a more detailed representation of a user receiver portion of the user transceiver of FIG. 4.

User Transceiver—FIGS. 4, 5 and 6

In FIG. 4, the user transceiver 25 is representative of transceivers for each of the users 15 in FIG. 3. The user transceiver 25 includes an RF subsystem group 26 which has a receive antenna 28 and a transmit antenna 29. The receive antenna 28 receives the forward channel communications from the broadcaster 16-1 in the zone manager 20-1 of FIG. 3. The transmit antenna 29 transmits with a user transmission range which, for example, in FIG. 3 for the user U1 reaches the plurality of collectors C1, . . . , C-Nc.

In FIG. 4, the RF subsystem group communicates with a signal processor group 27. The signal processor group performs the processing necessary to receive and transmit voice signals for a cellular phone.

In FIG. 5, the user transmitter 21, which forms a portion of FIG. 4, is shown including the RF subsystem group 26 and the signal processor group 27. For the reverse channel communications, the voice input passes through the speech coder 34, the block coder 30, the convolution coder 33, the interleaver 32, a signal modulator such as a Gaussian minimum shift keyed (GMSK) modulator 38 in a GSM embodiment, the digital-to-analog (D/A) converter 35, to the RF subsystem group 26 including the IF/RF unit 36 and the amplifier 37 which connects to the transmit antenna 29.

In FIG. 6, the user receiver 22, which forms a portion of FIG. 4, is shown including the RF subsystem group 26 and the signal processor group 27. The receive antenna 28 connects to the RF subsystem group 26 including the amplifier 37 and the IP/RF unit 36 which in turn is connected to an analog-to-digital (A/D) converter 35, an equalizer 31, a de-interleaver 32, a convolution decoder 33, a block decoder 30 and a speech decoder 34 which outputs a digital waveform which can be converted to voice.

Figure 7:
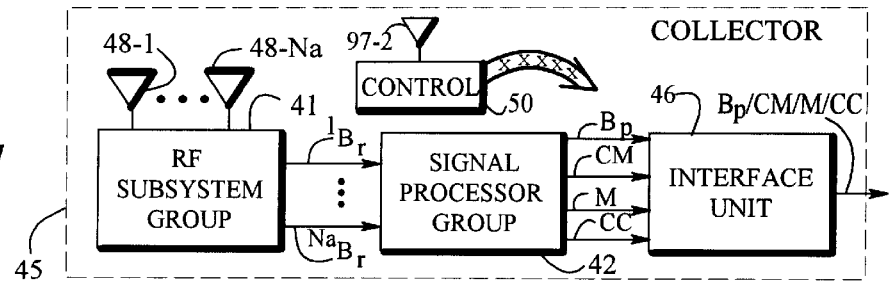
FIG. 7 depicts a representation of a collector.
Figure 8:
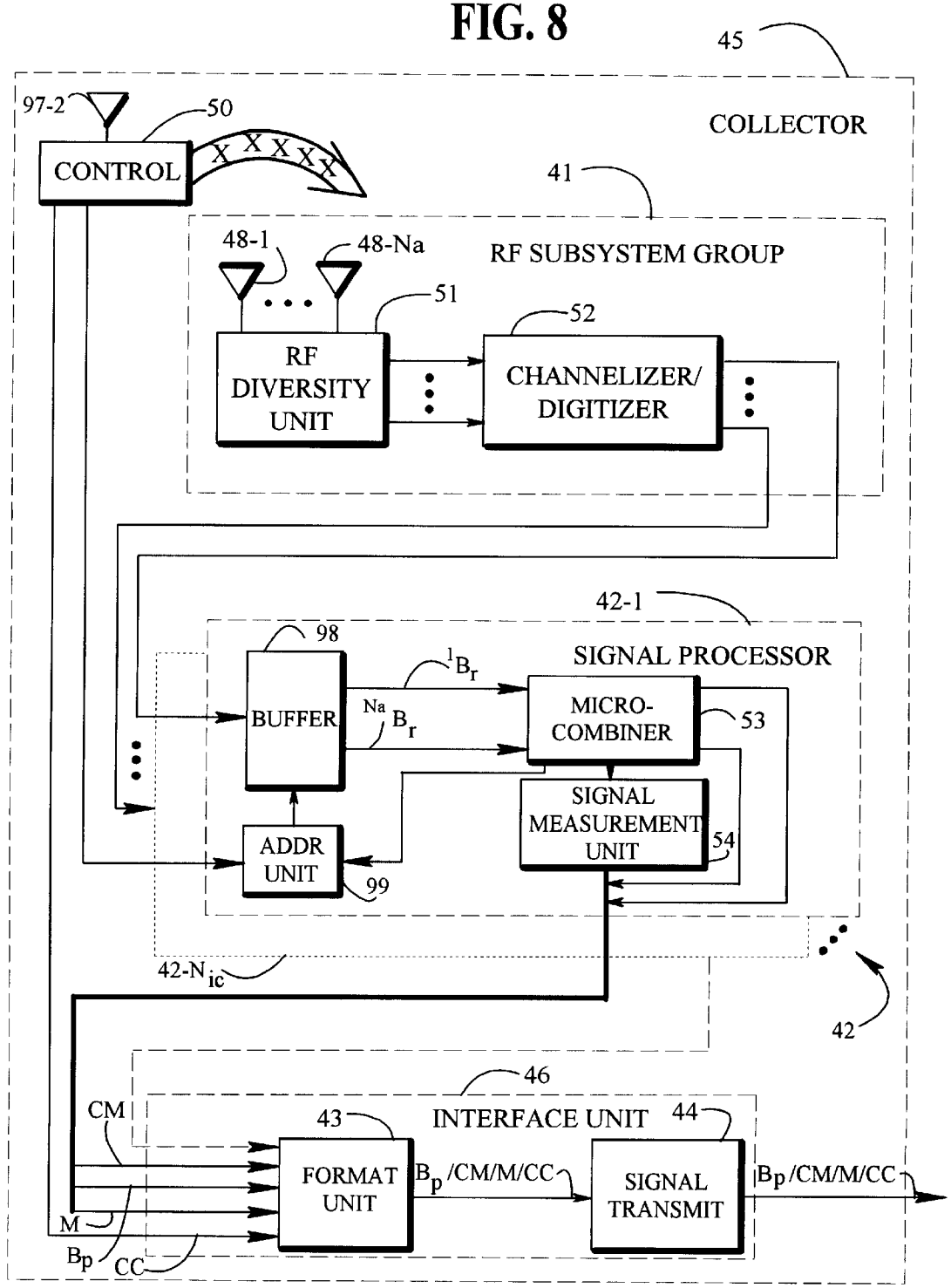
FIG. 8 depicts a more detailed representation of a collector.

Collector—FIGS. 7 and 8

In FIG. 7, the collector 45 is typical of the collectors C1, . . . , C-Nc and other collectors 19 of FIGS. 1, 2 and 3. In FIG. 7, the collector 45 includes an RF subsystem group 41 which has two or more micro-diversity receive antennas of which antennas 48-1, . . . , 48-$N_a$ are typical. The antennas 48-1, . . . , 48-$N_a$ each receives the transmitted signals from each one of a plurality of user transceivers 25 of the FIG. 4 type. Each representation of a received signal from a single user that is received by the RF subsystem group 41 connects in the form of a burst of data to the signal processor group 42. The received bursts of data from the antennas 48-1, . . . , 48-$N_a$ are represented as $^1B_r$, . . . , $^{Na}B_r$, respectively, in FIG. 7. The signal processor group 42 processes the plurality of received bursts for a single user to form a single processed burst, $B_p$, representing the signals from the single user. The processed burst, $B_p$, has a confidence metric vector, CM, representing the reliability of each bit of the data comprising the processed burst, $B_p$. Each processed burst has the bits $\beta_{p1}, \beta_{p2}, \ldots, \beta_{pB}$ and the confidence metric vector, CM, has the corresponding confidence metrics $cm_1, cm_2, \ldots, cm_B$. Measurement signals are formed that measure the power or other characteristics of the signal. The processed burst, $B_p$, the confidence metric vector, CM, and the measurements, M, connect to the interface unit 46 which formats those signals and transmits or otherwise connects them as reverse channel signals to the aggregator 17-1 of zone manager 20-1 of FIG. 3.

In FIG. 7, the signal processor group 42 receives timing information that permits collector signals from each collector to be time synchronized with signals from each of the other collectors. For example, each collector has a global positioning system (GPS) receiver (not shown) for receiving a time synchronization signal. Alternatively, or in addition, the zone manager 20 or region manager 12 of FIG. 3 can broadcast or otherwise transmit time synchronization information. The signal processor provides a time stamp in the collector control (CC) signal that is forwarded from interface unit 46.

In FIG. 7, the control 50 performs control functions associated with the other units of the collector and in particular, receives the time synchronization signal through antenna 97-2 from the region manager 12 of FIG. 3 or from some other timing source.

In FIG. 8, the collector 45 of FIG. 7 is shown in further detail. In FIG. 8, the RF subsystem group 41 includes an RF diversity unit 51 that receives signals from users 15 on micro-diversity antennas 48-1, . . . , 48-$N_a$ and that connects to a channelizer/digitizer 52. The channelizer isolates signals on individual carriers for processing with an output for each of the carriers $N_1, \ldots, N_{ic}$. The digital signals from the channelizer/digitizer 52 for one carrier are input to the signal processor group 42-1 and specifically to a buffer 98. The address unit 99 selects from buffer 98 bursts that correspond to individual users for processing by micro-combiner 53. The micro-combiner 53 outputs processed data bit values in processed burst, $B_p$, and associated confidence metric values in confidence metric vector, CM. The data and metric values from signal processor 42-1 are connected directly to the format unit 43 in interface unit 46.

In FIG. 8, a plurality of signal processors 42-1, . . . , 42-$N_{ic}$, form a signal processor group 42 with one processor for each channel signal from the channelizer/digitizer 52. Each signal processor is like processor 42-1 and provides inputs to interface unit 46. The digital signals from the channelizer/digitizer 52 for a carrier are input to one of the signal processors 42-1, . . . , 42-Nc and a corresponding buffer like buffer 98 in signal processsor 42-1. The data and metric values from signal processors 42-1, . . . , 42-Nc are all connected directly to the format unit 43 in interface unit 46 for forwarding to an aggregator.

In FIG. 8, the control 50 performs control functions associated with the other units of the collector and in particular, receives the time synchronization signal through antenna 97-2 from the region manager 12 of FIG. 3 or from some other timing source. The control 50 generates a time stamp that is inserted at times into the control code (CC) field by the interface unit 43 so that each one or more bursts has a time stamp in a collector that is used at the aggregator to time correlate the same bursts from the same user that are processed at different collectors.

In FIG. 8, the address unit 99 controls the writing of the signals into buffer 98 and the reading of the signals from buffer 98. The address unit 99 is synchronized by coarse timing information from control 50 and by fine information from micro-combiner 53. The fine timing information is derived in a conventional manner by correlation of the received bursts with the timing sequence, identified hereinafter with reference to FIG. 15.

Further, a signal measurement unit 54 receives signals from the combiner 53 to form power or other measurements on the received bursts or on the processed signals from the combiner 53 to form a measurement signal, M, that inputs to interface unit 46.

The format unit 43 changes the format of the data and metric values from the signal processor group 42 to form signal, $B_p$/CM/M/CC and the format unit 43 connects to the signal transmit unit 44. The transmit unit 44 of collector 45 transmits or otherwise connects the reverse channel user information, $B_p$/CM/M/CC, to the aggregator 17-1 of the zone manager 20-1 of FIG. 3. The transmission medium between the collector 45 and the aggregator 17-1 can be land lines, such as wire or optical fiber, or can be RF transmission using either in-band or out-of-band RF transmission signals.

Figure 9:
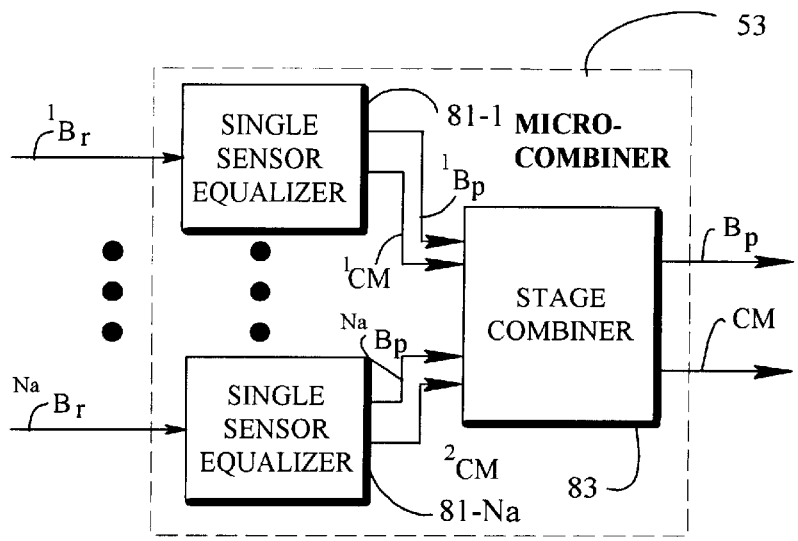
FIG. 9 depicts one embodiment of the combiner within the FIG. 8 collector.
Figure 10:
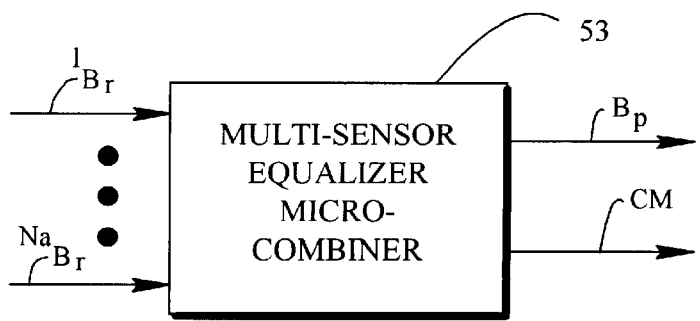
FIG. 10 depicts an alternate embodiment of the combiner within FIG. 8.

Micro-Combiner—FIGS. 9 and 10

In FIG. 9, details of one embodiment of the combiner 53 of FIG. 8 are shown. Each of the received data bursts $^1B_r, \ldots, ^{Na}B_r$ is input to a corresponding conventional MLSE single sensor equalizer 81-1, . . . , 81-Na. Each of the MLSE equalizers 81-1, . . . , 81-Na processes the input data bursts $^1B_r, \ldots, ^{Na}B_r$ and provides as outputs corresponding processed bursts $^1B_p, \ldots, ^{Na}B_p$, respectively, and corresponding confidence metric vectors $^1CM, \ldots, ^{Na}CM$, respectively. The processed bursts $^1B_p, \ldots, ^{Na}B_p$ and corresponding confidence metric vectors $^1CM, \ldots, ^{Na}CM$ are input to the stage combiner 83 which combines (by averaging or other combination) the received data bursts $^1B_r, \ldots, ^{Na}B_r$ to form the processed data burst, $B_p$, and combines the corresponding confidence metric vectors, $^1CM, \ldots, ^{Na}CM$, to form the resultant confidence metric vector, CM. The micro-combiner 53 of FIG. 9 operates in accordance with the TABLE 3A and Exp. (1A) operation as hereinafter explained. The processed data burst, $B_p$, includes the processed burst bit values $\beta_{p1}, \beta_{2p}, \ldots, \beta_{pB}$ and the resultant confidence metric vector, CM, includes the corresponding confidence metrics $cm_1, cm_2, \ldots, cm_B$ where B in the subscript is the number of bits in the burst and the number of corresponding confidence metrics, one confidence metric for each bit.

The stage combiner 83 of FIG. 9 receives a plurality of bursts $^1B_p, \ldots, {}^cB_p, \ldots, {}^{Na}B_p$, representing the reverse channel signals for the same particular one of the users 15 of FIG. 1 and combines them based on quality metrics. Each burst such as typical burst, $^cB_p$, includes data bits $^c\beta_{p1}, {}^c\beta_{p2}, \ldots, {}^c\beta_{pb}, \ldots, {}^c\beta_{pB}$, represented by confidence metric vector, $^c$CM, having confidence metrics, $^c$CM$_1$, $^c$CM$_2$, ..., $^c$CM$_b$, ..., $^c$CM$_B$. Each of the confidence metrics, such as typical confidence metric, $^c$CM$_b$, is in the form of a number, $^cc_p$, where $^cc_p$ is typically represented by two bytes of data and where $(-a) < {}^cc_p < (+a)$ and the amplitude a indicates the range for $^cc_p$. For γ equal to the number of bits in the confidence metric, $a = 2^{\gamma-1}$. A large positive confidence metric value, $^cc_p$, indicates a high confidence that $^cc_p$ is a binary 1. A large negative confidence value for $^cc_p$ indicates a high confidence that $^cc_p$ is a binary 0. In the embodiment described, the logical 1 and logical 0 values are represented by the sign of $^cc_p$ where a positive sign is 1 and a negative sign is 0. More generally, the confidence metrics, $^c$CM$_1$, $^c$CM$_2$, ..., $^c$CM$_b$, ..., $^c$CM$_B$ are represented by the signed numbers $^cc_1, {}^cc_2, \ldots, {}^cc_b, \ldots, {}^cc_B$ for each of the B bits in a burst $^cB_p$.

In an embodiment where $N_a$ representations, $^1\beta_{pb}, {}^2\beta_{pb}, \ldots, {}^{Na}\beta_{pb}$, of each bit are generated with confidence metrics, $^1$CM$_b$, $^2$CM$_b$, ..., $^{Na}$CM$_b$ for each bit, each measured by numbers $^1c_b, {}^2c_b, \ldots, {}^{Na}c_b$, respectively, with each number $^ac_b$ ranging between $(-a)$ and $(+a)$, the average aggregate confidence metric, $^{agg}c_b$ for each bit b is as follows:

$$^{agg}c_b = \frac{1}{N_c}\sum_{\alpha=1}^{N_a} {}^\alpha c_b$$

In FIG. 10, details of another embodiment of the combiner 53 of FIG. 8 are shown. Each of the received data bursts $^1B_r, \ldots, {}^{Na}B_r$ is input to a multi-sensor equalizer micro-combiner 53. The multi-sensor equalizer microcombiner 53 of FIG. 10 operates in accordance with the TABLE 3B and Exp. (1B) operation as hereinafter explained. The multi-sensor equalizer micro-combiner 53 processes the input data bursts $^1B_r, \ldots, {}^{Na}B_r$ and provides as an output the processed data burst, $B_p$ and corresponding confidence metric vector, CM. The FIG. 10 outputs are like the FIG. 9 outputs but the FIG. 10 outputs are generated in one integrated process rather than by separate processes as in FIG. 9. The FIG. 10 micro-combiner is more efficient and has better signal processing performance than the FIG. 9 embodiment in many environments.

Figure 11:
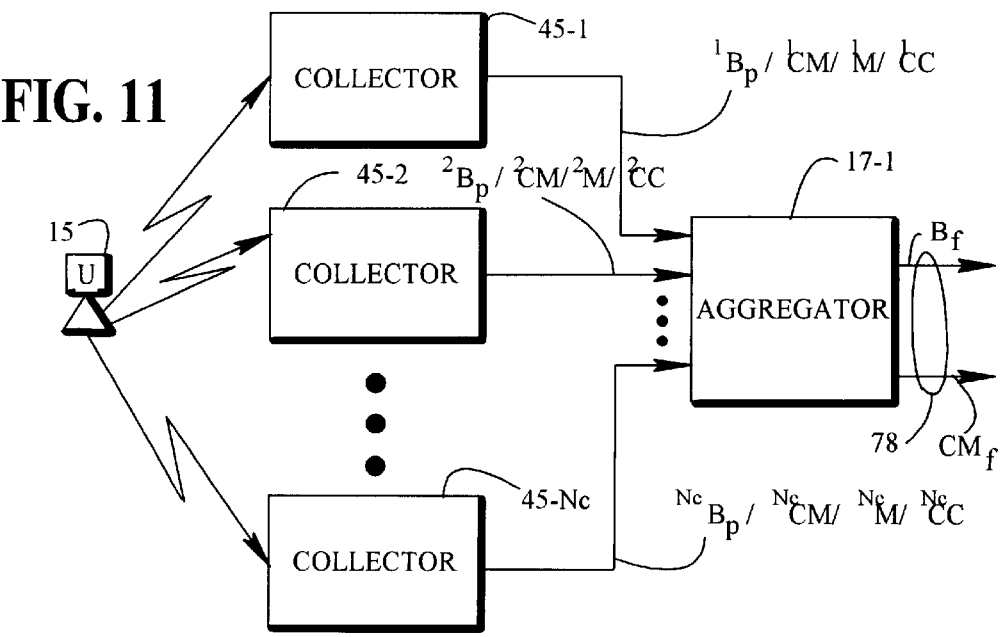
FIG. 11 depicts a plurality of collectors at macro-diverse locations forwarding collector signals to an aggregator.

Multiple-Collector Configuration—FIG. 11

In FIG. 11, a plurality of collectors 45-1, 45-2, ..., 45-Nc, like the collectors 19-1 in FIG. 1, each receive reverse channel communications from users like user 15. For each user 15, the collectors 45-1$_1$, 45-1$_2$, ..., 45-1$_{Nc}$ each generate data bursts, $^1B_p, {}^2B_p, \ldots, {}^{Nc}B_p$, respectively, and corresponding confidence metric vectors $^1$CM, $^2$CM, ..., $^{Nc}$CM, respectively, all representing the same communication from the user 15 with macro-diversity because of the large distances separating the collectors. These spatially macro-diverse data bursts $^1B_p, {}^2B_p, \ldots, {}^{Nc}B_p$, and corresponding confidence metric vectors $^1$CM, $^2$CM, ..., $^{Nc}$CM are forwarded to the aggregator 17-1 in formatted form designated as $^1B_p/^1$CM$/^1$M, $^2B_p/^2$CM$/^2$M, ..., $^{Nc}B_p/^{Nc}$CM$/^{Nc}$M in FIG. 11.

The aggregator 17-1 combines the spatially diverse data bursts $^1B_p, {}^2B_p, \ldots, {}^{Nc}B_p$, and corresponding confidence metric vectors $^1$CM, $^2$CM, ..., $^{Nc}$CM to form a final single representation of the data burst, $B_f$, with corresponding final confidence metric vectors, $C_f$. The aggregator 17-1 may or may not use the measurement signals $^1$M, $^2$M, ..., $^{Nc}$M in selecting or processing the data bursts $^1B_p, {}^2B_p, \ldots, {}^{Nc}B_p$, and/or the corresponding confidence metric vectors $^1$CM, $^2$CM, ..., $^{Nc}$CM. For example, if a particular burst is associated with a poor quality signal, the particular burst may be excluded from the aggregation. The quality of a signal is measured in one example based on the channel model attenuation estimate.

The channel model attenuation is proportional to the strength of the information component (as distinguished from the noise component) of the received signal. The channel model attenuation in combination with the total measured input power (for example, measured as the mean square value of the received input samples) is used to determine the signal-to-noise ratio of the received signal. If the the channel model attenuation, represented as a signal-to-noise ratio, is below some threshold, then the signal quality is judged to be poor and the particular burst is excluded from the aggregation.

Figure 14:
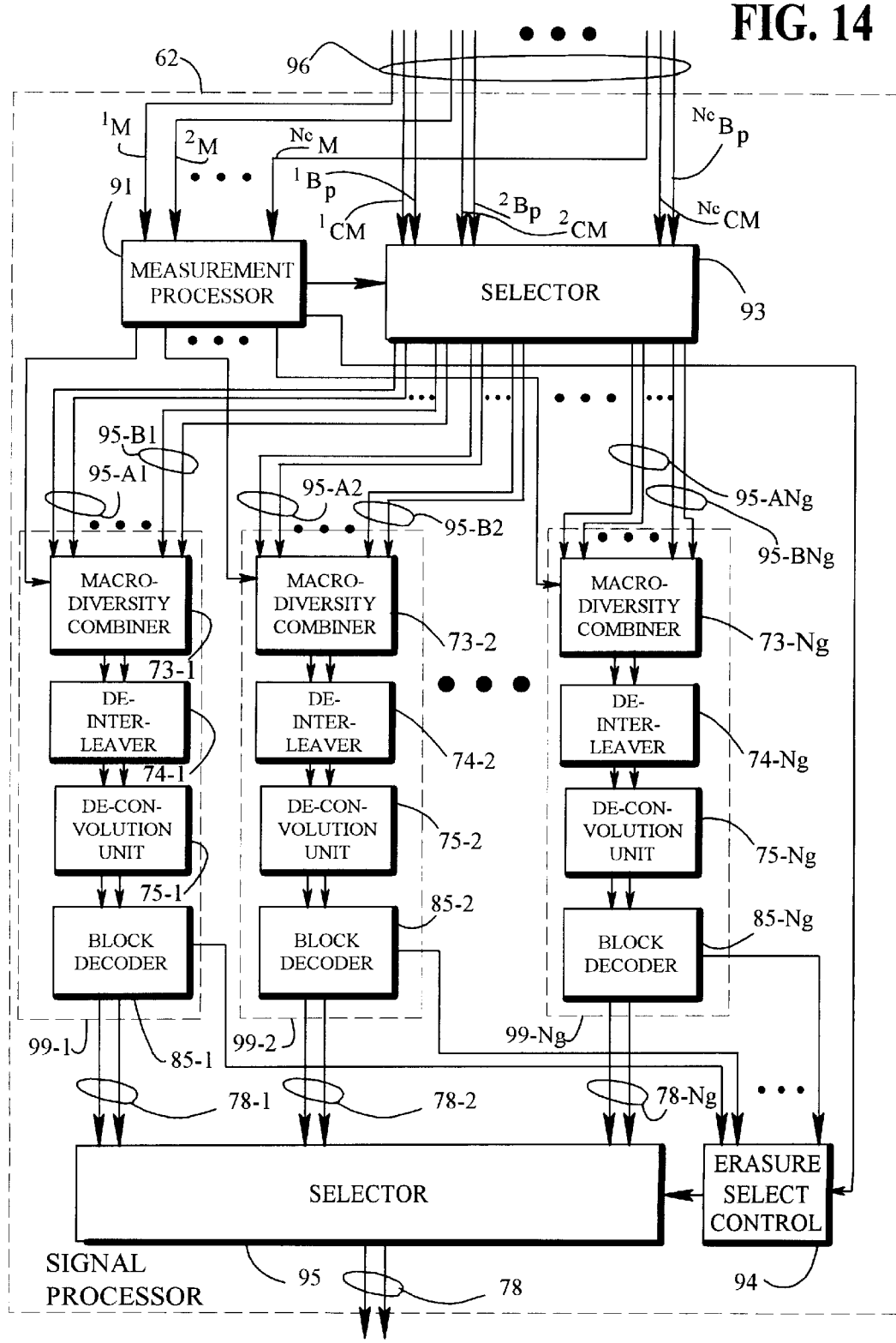
FIG. 14 depicts another representation of an embodiment of the aggregator of FIG. 12.

Aggregator—FIGS. 12, 13 and 14

In FIG. 12, a block diagram representation of the aggregator 17-1 of the zone manager 20-1 of FIG. 3 and of FIG. 11 is shown. The aggregator 17-1 includes a receive/format unit 61 which operates to receive and format signals transmitted by the signal transmit unit 44 of collectors 45 of the FIG. 8 and FIG. 11 type. The received signals $^1B_p/^1$CM$/^1$M$/^1$CC, $^2B_p/^2$CM$/^2$CC, ..., $^{Nc}B_p/^{Nc}$CM$/^{Nc}$M$/^{Nc}$CC, after formatting are connected to the signal processor 62 which processes the received signals for macro diversity combining. The format group 61 uses the time stamp and other collector control (CC) information to align the signals from different collectors for the same user. More specifically, the format unit 61 for each one or more bursts compares and aligns the time stamps from the control fields $^1$CC, $^2$CC, ..., $^{Nc}$CC so that the corresponding data, confidence metric and measurement signals from different collectors, for the same common user, are aligned. In FIG. 13, further details of the signal processor 62 for the aggregator 17-1 are shown. The signal processor 62 of FIG. 13 is a representation of the processing of burst signals from a single one of the users, for example user U1 of FIG. 3 or user 15 of FIG. 11, and the $N_c$ representations of the reverse channel signal from the user as received through the $N_c$ active collectors, such as the collectors C1, ..., C-Nc of FIG. 3 and collectors 45-1, 45-2, ..., 45-N$_c$ in FIG. 11.

In FIG. 13, the N$_c$ pairs of data and metric values at 96 for a single user, including the pairs [$^1B_b$, $^1$CM], [$^2B_b$, $^2$CM], ..., [$^{Nc}B_b$, $^{Nc}$CM], are combined in the macro-diversity combiner 73 to form a single final output pair, [$B_f$, Cm$_f$], at 78 of data and metric values.

The FIG. 13 signal processor 62 is a simple embodiment that may not use the measurement signals $^1$M, $^2$M, ..., $^{Nc}$M. The signal processor 62 is formed of a combiner unit that includes the macro-diversity combiner 73, de-interleaver 74, de-convolution unit 75 and block decoder 85. The data and metric values from the combiner 73 are de-interleaved in the de-interleaver 74 and de-convolved (that is, the convolutional coding is removed) in de-convolution unit 75. The data and metric outputs from the de-convolution unit 75 connect to the block decoder unit 85 and from there to the communications network 76 and, ultimately after connection through the network, to a speech decoder 77 to re-establish a user voice signal that corresponds to the user voice signal that was input to the user transceiver of FIG. 4.

In FIG. 14, the N, sets of data, metric and measurement values 96 for a single user are provided to the signal processor 62 for combining in a macro-diversity combiner to form a single output pair of data and metric values 78. The signal processor 62 is formed of a plurality of combiner unit groups 99 including groups 99-1, 99-2, . . . , 99-$N_g$ that each includes a macro-diversity combiner 73, de-interleaver 74, de-convolution unit 75 and block decoder 85.

The FIG. 14 signal processor 62 includes a measurement processor 91 that receives the measurement signals $^1M$, $^2M$, . . . , $^{Nc}M$ and processes them to determine which ones or all of the data and metric values are actually used in the macro-diversity combiners 73-1, 73-2, . . . , 73-Ng. As one example, the measurement signals are measures of the power of the received bursts and any burst that has a power level that is below a threshold is not selected for further processing. The selector 93 selects different ones of the data and metric input pairs as inputs to the macro-diversity combiners 73-1, 73-2, . . . , 73-Ng.

For example, combiner 73-1 may receive all of the pairs from inputs 96, combiner 73-2 may receive some subset such as three of the input pairs, and so on until combiner 73-Ng may receive only a single one of the input pairs. Of course, any combinations of sets of inputs may be selected by selector 93.

In FIG. 14, the measurement processor 91 provides weighting factors $^1w_b$, $^2w_b$, . . . , $^{\alpha}w_b$, . . . , $^{Nc}w_b$ corresponding to the data bits $^1\beta_p$, $^2\beta_p$, . . . , $^{Nc}\beta_p$. The weighting factors are used, for example, to weight the combination of bit values based upon a measurement parameter from measurement processor 91.

The data and metric values from the combiners 73-1, 73-2, . . . , 73-Ng are de-interleaved in the de-interleavers 74-1, 74-2, . . . , 74-Ng, respectively, and de-convolved in de-convolution units 75-1, 75-2, . . . , 75-Ng, respectively. The data and metric outputs from the de-convolution units 75-1, 75-2, . . . , 75-Ng connect to the block decoders 85-1, 85-2, . . . , 85-Ng, respectively, which in turn connect to the selector 95. The selector 95 operates, for example, on the frame erasure signals from the block decoders 85-1, 85-2, . . . , 85-Ng which are input to the erasure select control 94. The erasure select control 94 may inhibit any of the outputs 78-1, 78-2, . . . , 78-Ng from being connected as the output 78 that is associated with a frame erasure signal. When more than one of the outputs 78-1, 78-2, . . . , 78-Ng is available without a frame erasure signal, the one selected is the one corresponding to a particular measurement signal from measurement processor 91. For example, one having the highest power level is selected. The block decoders 85-1, 85-2, . . . , 85-Ng connect through selector 95 to the communications network 76 and ultimately after connection through the network to a vocoder 77, as shown in FIG. 13, to reestablish a voice signal that corresponds to the user voice signal that was input to the user transceiver of FIG. 4.

Figure 15:
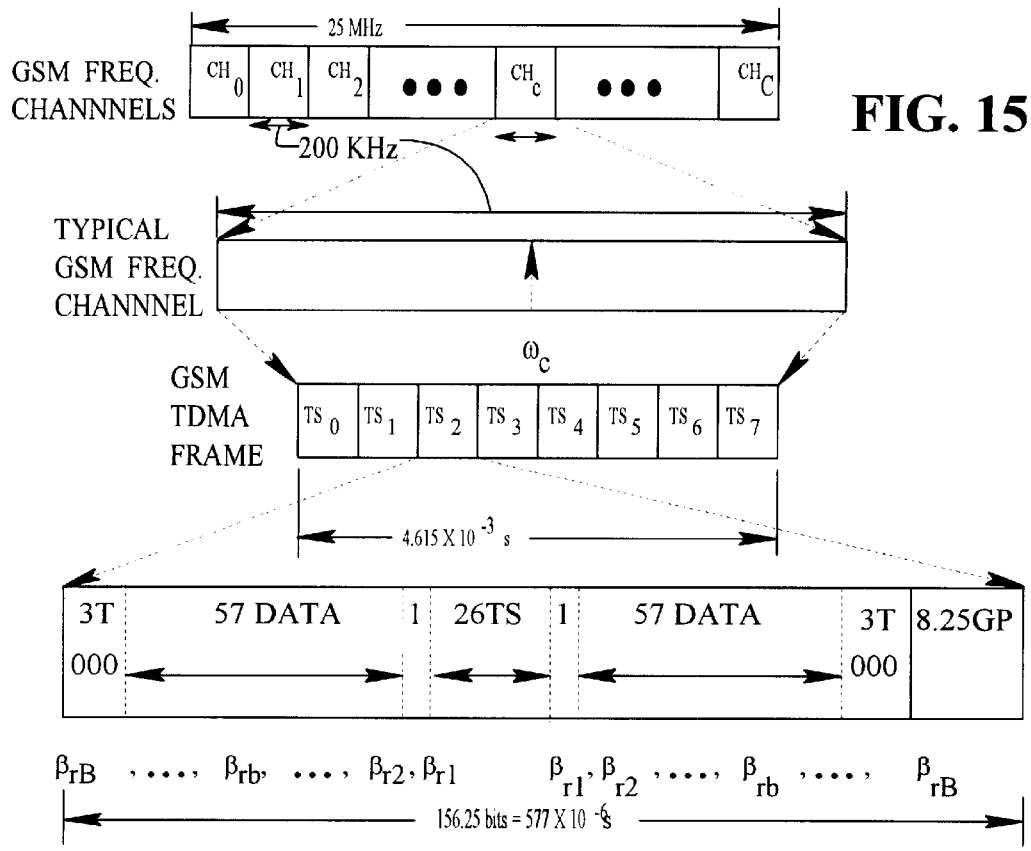
FIG. 15 depicts a representation of GSM signals.

GSM Data Burst—FIG. 15

In the FIG. 3 system, carrier frequencies $\omega_1(t)$, $\omega_2(t)$, . . . , $\omega_f(t)$ are center frequencies for the carriers $CH_0$, $CH_1$, . . . , $CH_c$, . . . , $C_C$. In a GSM embodiment, the carriers are each 200 KHz in bandwidth. The digital data has a bit rate of $270.833 \times 10^3$ bits per second. The data is transmitted using Gaussian Minimum Shift Key (GMSK) modulation, and filtered so that each carrier fits within a bandwidth of 200 KHz. For a GSM system, the information signal is in digital form and has logical 1's and logical 0's.

In GSM systems, each of the carriers is typically further divided into eight additional channels by time division multiplexing to form the eight time slots $TS_0$, $TS_1$, . . . , $TS_7$. Each of the time slots in a GSM system is defined to include 156.25 bits spread over a duration of $577 \times 10^4$ seconds. These bits in each time slot are selected as a logical 1 or a logical 0 for transmitting information including data and control information.

In FIG. 15, a representation of the data burst for a GSM signal is shown. The data bits include one or more beginning and ending bits of known logical states (1 or 0), for example, three beginning logical 0 bits (3T) and three ending logical 0 bits (3T). Additionally, there are an additional 57+1 data bits for a total of 61 leading data bits, a 26-bit training sequence (TS) and 57+1 additional data bits for a total of 61 data bits after the training sequence. The whole burst is followed by an 8.25 bit guard period which separates one burst from the next burst.

In FIG. 15, the 61 received data bits before the training sequence are in the order $\beta_{rB}$, . . . , $\beta_{rb}$, . . . , $\beta_{r3}$, $\beta_{r3}$, $\beta_{r1}$ and the 61 received data bits after the training sequence are in the order $\beta_{r1}$, $\beta_{r2}$, $\beta_{r3}$, . . . , $\beta_{rb}$, . . . , $\beta_{rB}$ where, in the example described, B=61.

Processing and Confidence Metric Generation—FIGS. 16–21

In operation of the FIG. 3 and FIG. 11 systems, digital RF signals are received as bursts from users 15 at the antennas of collectors 19 of FIG. 3 (collectors 45 of FIG. 11) and these received signal bursts are processed to yield a sequence of received signal samples, $\beta_{rb}$, and are processed to form confidence metrics, $cm_b$, and corresponding received bits, $\beta_{pb}$. To form the confidence metrics, $cm_b$, the collector operates algorithmically to provide an estimate of quality of each received signal sample, that is, an estimate of the probabilistic reliability of each logical 1 or logical 0 decision for each of the received signal samples, $\beta_{rb}$. One embodiment uses a soft Maximum Likelihood Sequence Estimate (MLSE) to form the confidence metrics.

The MLSE processing occurs for each of the received samples, $\beta_{rb}$, for b=1, 2, . . . , B to produce processed data bits, $\beta_{pb}$, for b=1, 2, . . . , B. The processing is based upon a channel model that is an estimate of the actual radio channel transmission which the burst encountered in the transmission from the user 15 to the collector 19. The channel is modeled at baseband as a complex finite-impulse response (FIR) filter.

The processing variables for an x-bit channel model for data bits b=1, 2, . . . , B and for channel model taps, t, where t=0, 1, . . . , t, . . . , T and where T=2 X−1 are set forth in the following TABLE 1A.

TABLE 1A
Channel Target Values: $_0CT$, $_1CT$, . . . , $_tCT$, . . . , $_TCT$
Received Burst Sample: $\beta_{rb}$
Branch Metric Values: $_0BM_b$, $_1BM_b$, . . . , $_1BM_b$, . . , $_TBM_b$
Path Metric Values: $_0PM_b$, $_1PM_b$, . . . , $_1PM_b$, . . . , $_{(T+1)/2}PM_{b2}$
Trace Vector Values: $_0TV_b$, $_1TV_b$, . . . , $_tTV_b$, . . . , $_{(T+1)/2}TV_b$ Confidence Metric Values: $_0cm_b, _1cm_b, \ldots, _tcm_b, \ldots, _{(T+1)/2}cm_b$ Processed Burst Bit: $\beta_{pb}$ When micro-diversity is employed, a channel model is derived for each antenna and the TABLE 1A Channel Target Values are calculated for and the Received Burst Samples are present for each of the $N_a$ antennas as indicated in the following TABLE 1B where the Received Burst Samples have been expanded for all samples (b=1, ..., B) in a burst.

TABLE 1B

Figure 16:
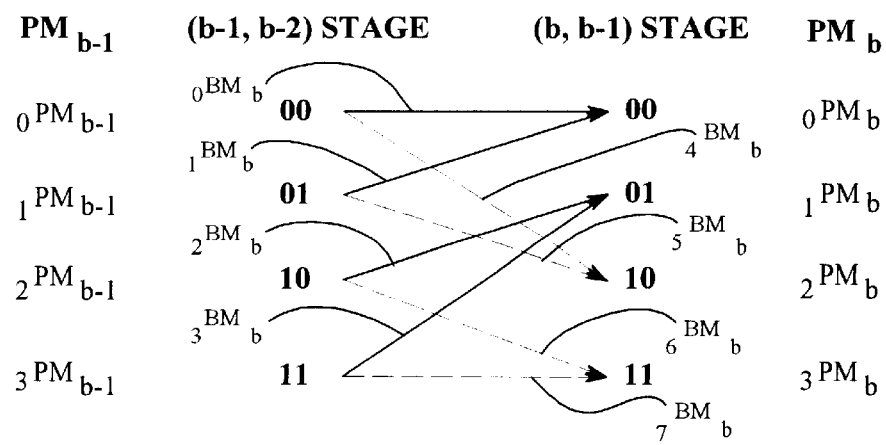
FIG. 16 depicts a representation of a MSLE trellis state diagram.

Channel Target Values:
$_0{}^1CT, _1{}^1CT, \ldots, _t{}^1CT, \ldots, _T{}^1CT$
$_0{}^2CT, _1{}^2CT, \ldots, _t{}^2CT, \ldots, _T{}^2CT$
•
•
•
$_0{}^\alpha CT, _1{}^\alpha CT, \ldots, _t{}^\alpha CT, \ldots, _T{}^\alpha CT$
•
•
•
$_0{}^{Na}CT, _1{}^{Na}CT, \ldots, _t{}^{Na}CT, \ldots, _T{}^{Na}CT$ Received Burst Samples:
$^1\beta_{r1}, {}^1\beta_{r2}, {}^1\beta_{r3}, \ldots, {}^1\beta_{rb}, \ldots, {}^1\beta_{rB}$
$^2\beta_{r1}, {}^2\beta_{r2}, {}^2\beta_{r3}, \ldots, {}^2\beta_{rb}, \ldots, {}^2\beta_{rB}$
•
•
•
$^\alpha\beta_{r1}, {}^\alpha\beta_{r2}, {}^\alpha\beta_{r3}, \ldots, {}^\alpha\beta_{rb}, \ldots, {}^\alpha\beta_{rB}$
•
•
•
$^{Na}\beta_{r1}, {}^{Na}\beta_{r2}, {}^{Na}\beta_{r3}, \ldots, {}^{Na}\beta_{rb}, \ldots, {}^{Na}\beta_{rB}$ In FIG. 16, a trellis diagram is shown for the x=3 case that represents the processing of received samples on a sample-by-sample (sometimes called bit-by-bit) basis. In one embodiment, for a GSM system, x is equal to 5. In FIG. 16, the current received bit (sample), $\beta_{rb}$, has a current state designated by b together with previous bit, $\beta_{rb-1}$, having a prior state designated by b−1. The predecessor state includes the b−1 and b−2 bit designations. Processing in accordance with FIG. 16 involves for each received bit, $\beta_{rb}$, the (b−1, b−2) predecessor stage and the (b, b31 1) current stage. For processing variables k, m, and t are defined in accord with the following TABLE 2.

TABLE 2

| k = (b, b − 1) | $k_D$ | m | t |
|---|---|---|---|
| 00 | 0 | 0 | 0 |
| 00 | 0 | 1 | 1 |
| 01 | 1 | 0 | 2 |
| 01 | 1 | 1 | 3 |
| 10 | 2 | 0 | 4 |
| 10 | 2 | 1 | 5 |
| 11 | 3 | 0 | 6 |
| 11 | 3 | 1 | 7 |

In TABLE 2, the value of k is the current state value of the (b, b−1) stage, $k_D$ is the decimal equivalent of k, the value is (b−2), and the value of t is $k_D(2^{x-2})+m$. The bit sequencing algorithm for converting the received data bits, $\beta_{rb}$ for b=1, 2, ..., B to the processed data bits, $\beta_{rb}$, for b=1, 2, ..., B is set forth in the following SEQUENCE 1.

SEQUENCE 1
COPYRIGHT ® Cellular Telecom, Ltd. 1997

(0) Derotate to convert Gaussian minimum shift keyed (GMSK) signal to an approximation of a binary phase shift keyed (BPSK) signal with a received burst, $B_r$ (in GSM embodiment).

(1) Correlate received burst, $B_r$, with stored known training sequence, $TS_s$, to identify location of received training sequence, $TS_r$, within received burst.

(2) Calculate x-bit channel model, ChMod, having x taps and such that [ChMod]*[$TS_s$] = [$TS_r$] where the symbol "*" denotes the convolution function. In a GSM embodiment, the correlation values from step 1 surrounding the largest correlation value can be used as the channel model.

(3) Compute and store $2^x$ complex channel model target values, $_tCT$, for each of $2^x$ possible outputs formed by the dot products of the channel tap values and the $2^x$ possible combinations of length x sequence of the symbols +1 and −1.

(4) Forward process for each bit, b, where b = 1, 2, ..., B − 1, B,
For each current state k,
For each of the two predecessor states m,
Calculate an associated branch metric $_tBM_b$ by calculating the squared distance between the complex received sample $B_{rb}$ value and the corresponding complex channel model target value $_tCT$ where t = $k_D(2^{x-2})$ + m.
Calculate candidate path metrics $_qPM_b$ by adding the prior path metrics $_qPM_{b-1}$ for predecessor states m to the associated branch metrics $_tBM_b$ where q = $(2k_D)(mod2^{x-1})$ + m.
Select the lowest of the candidate path metrics $_qPM_b$ as the winning actual path metric, $_{kD}PM_b$, for the current state.
Calculate initial confidence metric, $_{kD}CM_b$, values as the difference between the candidate path metrics, $_qPM_b$.
Record the logical 1 or 0 state corresponding to the winning actual path metric, $_{kD}PM_b$, for the current state as a trace vector value, $_{kD}TV_b$, for the current state.
Update confidence metric.

(5) Reverse process for each bit, b, where b = B, B − 1, ..., 2, 1
Starting with the last trellis stage with the lowest path length, trace the sequence of states back to the beginning of the bit sequence using the winning predecessor state as determined in step (4) and recorded in the trace vectors, $_{kD}PM_b$, above to determine each processed burst bit, $\beta_{pb}$.

An example of the bit sequencing of SEQUENCE 1 for an x=3 channel model with $2^x=8$ is described where the TABLE 1 values are given for each bit b and T−1=7 in TABLE 3A as follows:

TABLE 3A

| | |
|---|---|
| Channel Target Values: | $_0CT, _1CT, _2CT, _3CT, _4CT, _5CT, _6CT, _7CT$ |
| Received Burst Sample: | $\beta_{rb}$ |
| Branch Metric Values: | $_0BM_b, _1BM_b, _2BM_b, _3BM_b, _4BM_b, _5BM_b, _6BM_b, _7BM_b$ |
| Path Metric Values: | $_0PM_b, _1PM_b, _2PM_b, _3PM_b$ |
| Trace Vector Values: | $_0TV_b, _1TV_b, _2TV_b, _3TV_b$ |
| Confidence Metric Values: | $_0cm_b, _1cm_b, _2cm_b, _3cm_b$ |
| Processed Burst Bit: | $\beta_{pb}$ |

When micro-diversity is employed, a channel model is derived for each antenna and the TABLE 3A Channel Target Values are calculated for and the Received Burst Samples are present for each of the Na antennas (in an embodiment where the Received Burst Samples are present for b=1, 2, ..., 61) as indicated in the following TABLE 3B.

TABLE 3B

| Channel Target Values: | $_0^1CT, {_1}^1CT, {_2}^1CT, {_3}^1CT, {_4}^1CT, {_5}^1CT, {_6}^1CT, {_7}^1CT$ |
| --- | --- |
| | $_0^2CT, {_1}^2CT, {_2}^2CT, {_3}^2CT, {_4}^2CT, {_5}^2CT, {_6}^2CT, {_7}^2CT$ |
| | • |
| | • |
| | • |
| | $_0^\alpha CT, {_1}^\alpha CT, {_2}^\alpha CT, {_3}^\alpha CT, {_4}^\alpha CT, {_5}^\alpha CT, {_6}^\alpha CT, {_7}^\alpha CT$ |
| | • |
| | • |
| | • |
| | $_0^{Na}CT, {_1}^{Na}CT, {_2}^{Na}CT, {_3}^{Na}CT, {_4}^{Na}CT, {_5}^{Na}CT, {_6}^{Na}CT, {_7}^{Na}CT$ |
| Received Burst Samplez: | $^1\beta_{r1}, ^1\beta_{r2}, ^1\beta_{r3}, \ldots, ^1\beta_{rb} \ldots, ^1\beta_{r61}$ |
| | $^2\beta_{r1}, ^2\beta_{r2}, ^2\beta_{r3}, \ldots, ^2\beta_{rb} \ldots, ^2\beta_{r61}$ |
| | • |
| | • |
| | • |
| | $^\alpha\beta_{r1}, ^\alpha\beta_{r2}, ^\alpha\beta_{r3}, \ldots, ^\alpha\beta_{rb} \ldots, ^\alpha\beta_{r61}$ |
| | • |
| | • |
| | • |
| | $^{Na}\beta_{r1}, ^{Na}\beta_{r2}, ^{Na}\beta_{r3}, \ldots, ^{Na}\beta_{rb} \ldots, ^{Na}\beta_{r61}$ |
| Processed Burst Bits: | $^1\beta_{p1}, ^1\beta_{p2}, ^1\beta_{p3}, \ldots, ^1\beta_{pb} \ldots, ^1\beta_{p61}$ |

The bit-by-bit processing commences for each $\beta_{rb}$ by determining the branch metric difference values $_0Bm_{rb}$, $_1BM_{rb}, \ldots, _7BM_{rb}$ as follows:

$$(b-1, b-2)\ldots(b-(x-1)) \quad (b) \qquad \text{Exp. (1A)}$$

| $\overline{00\ldots 0}$ | 0 | $_0BM_b = (\beta_{rb} - {_0}CT)^2$ |
| $\overline{00\ldots 0}$ | 1 | $_1BM_b = (\beta_{rb} - {_1}CT)^2$ |
| $\overline{00\ldots 1}$ | 0 | $_2BM_b = (\beta_{rb} - {_2}CT)^2$ |
| $\overline{00\ldots 1}$ | 1 | $_3BM_b = (\beta_{rb} - {_3}CT)^2$ |
| ⋮ | | |
| $\overline{11\ldots 0}$ | 0 | $_{T-3}BM_b = (\beta_{rb} - {_{T-3}}CT)^2$ |
| $\overline{11\ldots 0}$ | 1 | $_{T-2}BM_b = (\beta_{rb} - {_{T-2}}CT)^2$ |
| $\overline{11\ldots 1}$ | 0 | $_{T-1}BM_b = (\beta_{rb} - {_{T-1}}CT)^2$ |
| $\overline{11\ldots 1}$ | 1 | $_TBM_b = (\beta_{rb} - {_T}CT)^2$ |

Exp (1A) is the branch metric calculation used in the embodiment of FIG. 9, for each MLSE single sensor equalizer.

Using the TABLE 3B values, the bit-by-bit processing commences for each $^\alpha B_{r1}, ^{\alpha B}_{r2}, ^{\alpha B}_{r3}, \ldots, ^{\alpha B}_{rb} \ldots, ^{\alpha B}_{r61}$, by determining the branch metric difference values $_0BM_{rb}$, $_1BM_{rb}, \ldots, _7BM_{rb}$ as follows:

$$(b-1, b-2)\ldots(b-(x-1)) \quad (b) \qquad \text{Exp. (1B)}$$

| $\overline{00\ldots 0}$ | 0 | $_0BM_b = \sum_{a=1}^{N_a} (^\alpha\beta_{rb} - {_0^\alpha}CT)^2$ |
| $\overline{00\ldots 0}$ | 1 | $_1BM_b = \sum_{a=1}^{N_a} (^\alpha\beta_{rb} - {_1^\alpha}CT)^2$ |
| $\overline{00\ldots 1}$ | 0 | $_2BM_b = \sum_{a=1}^{N_a} (^\alpha\beta_{rb} - {_2^\alpha}CT)^2$ |
| $\overline{00\ldots 1}$ | 1 | $_3BM_b = \sum_{a=1}^{N_a} (^\alpha\beta_{rb} - {_3^\alpha}CT)^2$ |
| ⋮ | | |
| $\overline{11\ldots 0}$ | 0 | $_{T-3}BM_b = \sum_{a=1}^{N_a} (^\alpha\beta_{rb} - {_{T-3}^\alpha}CT)^2$ |
| $\overline{11\ldots 0}$ | 1 | $_{T-2}BM_b = \sum_{a=1}^{N_a} (^\alpha\beta_{rb} - {_{T-2}^\alpha}CT)^2$ |
| $\overline{11\ldots 1}$ | 0 | $_{T-1}BM_b = \sum_{a=1}^{N_a} (^\alpha\beta_{rb} - {_{T-1}^\alpha}CT)^2$ |
| $\overline{11\ldots 1}$ | 1 | $_TBM_b = \sum_{a=1}^{N_a} (^\alpha\beta_{rb} - {_T^\alpha}CT)^2$ |

Exp (1B) is the branch metric calculation used in the embodiment of FIG. 10. In Exp. (1B) if $N_a=1$, then Exp. (1B) reverts to Exp. (1A). In Exp. (1A) and Exp. (1B), the $\beta_{rb}$ and CT values are complex numbers. The path metric, vector $PM_b$ (including $_0PM_b$, $_1PM_b$, $_2PM_b$, $_3PM_b$ in the example described) is determined for each bit b. In FIG. 16, a trellis is used to explain the formation of the path metric vector, $PM_b$. Each of the 61 bits, b, after determination of the training sequence are processed one bit at a time where b=1, 2, . . . , 60, 61. Each bit, b, for each particular state is either a logical 1 or a logical 0. Any particular bit, b, is preceded by prior bits as part of the sequence b−2, b−1, b. Each state in the b−1, b−2 stage corresponds to a hypothesis about what the transmitted bits b−1, b−2 were. A transition from a stage (b−1, b−2) state to a stage (b, b-i) state represents a hypothesis about what the bits b, b−1, b−2 were. In effect, the transitions represent bits shifting into and out of a shift register, so only certain transitions are possible. These transitions are the lines shown in FIG. 16 between the b−1, b−2 stage and the b, b−1 stage. As indicated in FIG. 16, the 2-bit sequence (b−1, b−2) can have the binary values 00, 01, 10, and 11 and similarly the 2-bit sequence (b, b−1) can have the binary values 00, 01, 10, and 11. Each of the binary values 00, 01, 10, and 11 of the 2-bit sequence (b, b−1) can result from two different ones of the possible 2-bit sequences (b−1, b−2) and these transitions are shown in FIG. 16 by the arrows associated with the branch metric vector $BM_p$. For example, the (b, b−1) state 00 can result from either the (b−1, b−2) state 00 by means of the transition labeled by branch metric $_0BM_b$ or the (b−1, b−2) state 01 by means of the transition labeled by branch metric $_1BM_b$. A decision as to which one of the two possible transitions is more probable is made based upon the accumulated path metric vector, $PM_{b−1}$, preceding the transition from (b−1, b−2) to (b, b−1). For example, for the (b, b−1) state 00, the (b−1, b−2) state 00 adds the branch metric $_0BM_b$ to the path metric $_0PM_{b−1}$ and the (b−1, b−2) state 01 adds the branch metric $_1BM_b$ to the path metric $_1PM_{b−1}$. The most probable transition of the two possible transitions is determined as the transition which has the minimum sum of the prior path metric and the current branch metric. For example, considering the (b, b−1) state 00, the winner of the two possible transitions is the lower of $(_0PM_{b−1}+{_0}BM_{b−1})$ and $(_1PM_{b−1}+{_1}BM_{b−1})$ so that the current path metric, $_0PM_b$, is equal to MIN[ $(_0PM_{b−1}+{_0}BM_{b−1}), (_1PM_{b−1}+{_1}BM_{b−1})$]. Similarly, all of the current path metrics for bit b are given as follows:

$$_0PM_b = \text{MIN}[(_0PM_{b−1} + {_0}BM_b), (_1PM_{b−1} + {_1}BM_b)] \qquad \text{Exp. (2)}$$

$$_1PM_b = \text{MIN}[(_2PM_{b−1} + {_2}BM_b), (_3PM_{b−1} + {_3}BM_b)]$$

-continued $$_2PM_b = \text{MIN}[(_0PM_{b-1} + _4BM_b), (_1PM_{b-1} + _5BM_b)]$$

$$_3PM_b = \text{MIN}[(_2PM_{b-1} + _6BM_b), (_3PM_{b-1} + _7BM_b)]$$

An indication of which of the MIN comparisons in Exp. (2) is the winning value is stored in a trace vector having the values $_0TV_b$, $_1TV_b$, $_2TV_b$, $_3TV_b$ for the bit b and having the values $_0TV_{b-1}$, $_1TV_{b-1}$, $_2TV_{b-1}$, $_3TV_{b-1}$ for the bit b−1. For example, for the current path metric,$_0PM_b$, the MIN comparison is $\text{MIN}[(_0PM_{b-1}+_0BM_{b-1}), (_1PM_{b-1}+_1BM_{b-1})]$. If $(_0PM_{b-1}+_0BM_{b-1})$ wins the comparison by being the smaller value, trace vector $_0TV_b$ has a logical value of 0 and if $(_1PM_{b-1}+_1BM_{b-1})$ wins the comparison, trace vector $_0TV_b$ has a logical value of 1. Similarly, each of the other trace vectors $_1TV_b$, $_2TV_b$, $_3TV_b$ for bit b are set to logical 1 or 0 values as a function of the corresponding MIN comparisons.

The difference between the winning and losing paths for bit b is the initial confidence metric vector, $CM_b$. For example, the initial confidence metric value, $_0CM_b$, is equal to the absolute value of the $[(_0PM_{b-1}+_0BM_{b-1})-(_1PM_{b-1}+_1BM_{b-1})]$. Each of the initial confidence metric values $_0CM_b$, $_1CM_b$, $_2CM_b$ and $_3CM_b$ is calculated and stored. The initial confidence metric values are subsequently reduced to adjusted confidence metric values if subsequent initial confidence metric values in a chain are lower than former initial confidence metric values in the chain.

The reduction in confidence metric values is explained with reference to FIG. 17. In FIG. 17, for the currently processed bit, b, it is assumed for purposes of explanation that the lowest path metric value for $_0PM_b$ is arrived at via the branch metric $_0BM$, so that the trace vector value, $_0TV_b$, is a logical 0. The prior bit, b−2, was either a logical 0 if the state at b was arrived at by means of the $_0BM_b$ branch metric or was a logical 1 if the current state at b was arrived at by means of the $_1BM_b$ branch metric. Accordingly, two alternate backward chains exist for arriving at the $_0PM_b$ path metric.

In FIG. 18, for the currently processed bit, b, it is assumed for purposes of explanation that the path metric value of $_1PM_b$ was arrived at via the branch metric $_2BM_{b=b}$ so that the trace vector value, $_1TV_b$, is a logical 0. The prior bit, b−2, was a logical 0 since the current state at b was arrived at by means of the $_2BM_{b=b}$ branch metric and would have been a logical 1 if the current value of b was arrived at by means of the $_3BM_{b=b}$ branch metric.

In FIG. 17, for purposes of explanation, it is assumed that the lower string to the path metric $_0PM_b$ traces back through the branch metrics $_1BM_{b=b}$, $_3BM_{b=b-1}$, $_6BM_{b=b-2}$, $_4BM_{b=b-3}$, $_1BM_{b=b-4}$. Further for purposes of explanation, it is assumed that the upper string to the path metric $_0PM_b$ traces back through the branch metrics $_0BM_{b=b}$, $_0BM_{b=b-1}$, $_0BM_{b=b-2}$, $_0BM_{b=b-3}$, $_1BM_{b=b-4}$. Note that the chain terminates in FIG. 17, in the assumed example, at b=b−4 since the upper and lower strings intersect at that point.

The initial confidence metrics $_0CM_b$, $_1CM_b$, $_2CM_b$ and $_3CM_b$ for each of the values of b equal to b, b−1, b−2, b−3 and b−4 in FIGS. 17 and 18, are designated $_0CM_{b=b}$, $_1CM_{b=b}$, $_2CM_{b=b}$ and $_3CM_{b=b}$; $_0CM_{b=b-1}$, $_1CM_{b=b-2}$, $_2CM_{b=b-1}$ and $_3CM_{b=b-1}$; $_0CM_{b=b-2}$, $_1CM_{b=b-2}$, $_2CM_{b=b-2}$ and $_3CM_{b=b-2}$; and $_0CM_{b=b-3}$, $_1CM_{b=b-3}$, $_2CM_{b=b-3}$ and $_3CM_{b=b-3}$.

At bits where the trace vector values are the same for each of the reverse strings, the adjusted confidence metric values remain the same as the initial confidence metric values. However, where the trace vector values are opposite for any prior bit in the chain, the confidence metrics for those bits are adjusted to the lower of the initial confidence value for that prior bit in the chain and the confidence metric value for the current bit in the chain. Referring to FIG. 17 for example where the two intersecting chains are shown bold, the trace vector values are the same for prior bit b−2 (that is referring to FIG. 19 where $_0TV_{b=b-2}=_1TV_{b=b-2}=0$) and are the same for prior bit b−3 (that is, $_0TV_{b=b-3}=_2TV_{b=b-3}=0$) and are different for prior bit b−1 (that is, $_0TV_{b=b-1} \ne _1TV_{b=b-1}$). Therefore, the adjusted confidence metrics, $_{0a}CM_b$ for prior bit b−1 are $_{0a}CM_{b=b-1}=\text{MIN}[_0CM_{b=b-1}, _0CM_{b=b}]$. The FIG. 17 example is given only by way of explanation where the chain extended from b to b−4. In general, chains can be of any length from a minimum of b to b−3 or from b to any value greater than b−3, including the entire length of the burst of data (61 bits in the present example).

Bit-by-By Processing For b=1 To b=61

FIG. 15 signal includes two 61 bit data sequences. Each of those bursts is separately processed for b=1, 2, 3, . . . , 61. As a specific example for b=1 and for $\beta_{r1}$ in Exp. (1) above, the branch metric values are determined as follows:

$$\overline{(b-1, b-2)} \quad (b) \hspace{4cm} \text{Exp. (3)}$$

$$\overline{00} \quad 0 \quad _0BM_1 = \sum_{\alpha=1}^{N_\alpha} (^\alpha\beta_{rI} - ^\alpha_0 CT)^2$$

$$\overline{00} \quad 1 \quad _1BM_1 = \sum_{\alpha=1}^{N_\alpha} (^\alpha\beta_{rI} - ^\alpha_1 CT)^2$$

$$\overline{01} \quad 0 \quad _2BM_1 = \sum_{\alpha=1}^{N_\alpha} (^\alpha\beta_{rI} - ^\alpha_2 CT)^2$$

$$\overline{01} \quad 1 \quad _3BM_1 = \sum_{\alpha=1}^{N_\alpha} (^\alpha\beta_{rI} - ^\alpha_3 CT)^2$$

$$\overline{10} \quad 0 \quad _4BM_1 = \sum_{\alpha=1}^{N_\alpha} (^\alpha\beta_{rI} - ^\alpha_4 CT)^2$$

$$\overline{10} \quad 1 \quad _5BM_1 = \sum_{\alpha=1}^{N_\alpha} (^\alpha\beta_{rI} - ^\alpha_5 CT)^2$$

$$\overline{11} \quad 0 \quad _6BM_1 = \sum_{\alpha=1}^{N_\alpha} (^\alpha\beta_{rI} - ^\alpha_6 CT)^2$$

$$\overline{11} \quad 1 \quad _7BM_1 = \sum_{\alpha=1}^{N_\alpha} (^\alpha\beta_{rI} - ^\alpha_7 CT)^2$$

The accumulated path metric vector, $PM_{b-1}$, preceding the transition from (b−1, b−2) do not exist for b=1 and hence Exp. (2) above for b=1 becomes:

$$_0PM_1 = \text{MIN}[(_0BM_1), (_1BM_1)] \hspace{2cm} \text{Exp. (4)}$$

$$_1PM_1 = \text{MIN}[(_2BM_1), (_3BM_1)]$$

$$_2PM_1 = \text{MIN}[(_4BM_1), (_5BM_1)]$$

$$_3PM_1 = \text{MIN}[(_6BM_1), (_7BM_1)]$$

However, the values of the bits prior to the first bit b=1 are known since they are part of the training sequence. For purposes of explanation, it is assumed that for b=1, the two prior bits are (b−1)=1 and (b−2)=0. Accordingly, in Exp. (4)

and referring to FIG. 16, only the (b–1, b–2) stage 10 need be considered and hence Exp. (4) becomes as follows:

$$_1PM_1 = \text{MIN}[(_2BM_1), (_3BM_1)] \qquad \text{Exp. (5)}$$
$$_3PM_1 = \text{MIN}[(_6BM_1), (_7BM_1)]$$

Since it is known from the assumed values that $_2BM_1$ was the only possible branch metric, the MIN comparison with $_3BM_1$ is not required and the path metric $_1PM_1 = {_2BM_1}$. Also, it is known from the assumed values that $_6BM_1$ was the only possible branch metric, the MIN comparison with $_7BM_1$ is not required and the path metric $_3PM_1 = {_6BM_1}$. Trace vector values and confidence metric values are not required for b=1.

For b=2, the branch metrics are calculated as follows:

$$\overline{(b-1,b-2)} \quad (b) \qquad \text{Exp. (6)}$$

$$\overline{00} \quad 0 \quad _0BM_2 = \sum_{\alpha=1}^{N_a} (^\alpha\beta_{r2} - {^\alpha_0}CT)^2$$

$$\overline{00} \quad 1 \quad _1BM_2 = \sum_{\alpha=1}^{N_a} (^\alpha\beta_{r2} - {^\alpha_1}CT)^2$$

$$\overline{01} \quad 0 \quad _2BM_2 = \sum_{\alpha=1}^{N_a} (^\alpha\beta_{r2} - {^\alpha_2}CT)^2$$

$$\overline{01} \quad 1 \quad _3BM_2 = \sum_{\alpha=1}^{N_a} (^\alpha\beta_{r2} - {^\alpha_3}CT)^2$$

$$\overline{10} \quad 0 \quad _4BM_2 = \sum_{\alpha=1}^{N_a} (^\alpha\beta_{r2} - {^\alpha_4}CT)^2$$

$$\overline{10} \quad 1 \quad _5BM_2 = \sum_{\alpha=1}^{N_a} (^\alpha\beta_{r2} - {^\alpha_5}CT)^2$$

$$\overline{11} \quad 0 \quad _6BM_2 = \sum_{\alpha=1}^{N_a} (^\alpha\beta_{r2} - {^\alpha_6}CT)^2$$

$$\overline{11} \quad 1 \quad _7BM_2 = \sum_{\alpha=1}^{N_a} (^\alpha\beta_{r2} - {^\alpha_7}CT)^2$$

Using the accumulated path metrics preceding the transition from (b–1, b–2) for b=2 as shown in Exp. (2), Exp. (3) for b=2 becomes:

$$_0PM_2 = \text{MIN}[(_0BM_2), (_1PM_1 + {_1BM_2})] \qquad \text{Exp. (7)}$$
$$_1PM_2 = \text{MIN}[(_2BM_2), (_3PM_1 + {_3BM_2})]$$
$$_2PM_2 = \text{MIN}[(_4BM_2), (_1PM_1 + {_5BM_2})]$$
$$_3PM_2 = \text{MIN}[(_6BM_2), (_3PM_1 + {_7BM_2})]$$

Since it is known from the assumed values that the branch metrics $_0BM_2$, $_2BM_2$, $_4BM_2$ and $_6BM_2$ were not possible, none of the MIN determinations of Exp. (7) are required. Accordingly, the path metrics are set directly as $_0PM_2 = {_1PM_1} + {_1BM_2}$, $_1PM_2 = {_3PM_1} + {_3BM_2}$, $_2PM_2 = {_1PM_1} + {_5BM_2}$, $_3PM_2 = {_3PM_1} + {_7BM_2}$. Trace vector values and confidence metric values are not required for b=2.

For $P\beta_{r3}$, $$\overline{(b-1,b-2)} \quad (b) \qquad \text{Exp. (8)}$$

$$\overline{00} \quad 0 \quad _0BM_3 = \sum_{\alpha=1}^{N_a} (^\alpha\beta_{r3} - {^\alpha_0}CT)^2$$

$$\overline{00} \quad 1 \quad _1BM_3 = \sum_{\alpha=1}^{N_a} (^\alpha\beta_{r3} - {^\alpha_1}CT)^2$$

$$\overline{01} \quad 0 \quad _2BM_3 = \sum_{\alpha=1}^{N_a} (^\alpha\beta_{r3} - {^\alpha_2}CT)^2$$

$$\overline{01} \quad 1 \quad _3BM_3 = \sum_{\alpha=1}^{N_a} (^\alpha\beta_{r3} - {^\alpha_3}CT)^2$$

$$\overline{10} \quad 0 \quad _4BM_3 = \sum_{\alpha=1}^{N_a} (^\alpha\beta_{r3} - {^\alpha_4}CT)^2$$

$$\overline{10} \quad 1 \quad _5BM_3 = \sum_{\alpha=1}^{N_a} (^\alpha\beta_{r3} - {^\alpha_5}CT)^2$$

$$\overline{11} \quad 0 \quad _6BM_3 = \sum_{\alpha=1}^{N_a} (^\alpha\beta_{r3} - {^\alpha_6}CT)^2$$

$$\overline{11} \quad 1 \quad _7BM_3 = \sum_{\alpha=1}^{N_a} (^\alpha\beta_{r3} - {^\alpha_7}CT)^2$$

The accumulated path metrics, $PM_{b-1}$, preceding the transition from (b–1, b–2) exist for b=3 as indicated above in connection with Exp. (7) and hence Exp. (2) for b=3 becomes:

$$_0PM_3 = \text{MIN}[(_0PM_2 + {_0BM_3}), (_1PM_2 + {_1BM_3})] \qquad \text{Exp. (9)}$$
$$_1PM_3 = \text{MIN}[(_2PM_2 + {_2BM_3}), (_3PM_2 + {_3BM_3})]$$
$$_2PM_3 = \text{MIN}[(_0PM_2 + {_4BM_3}), (_1PM_2 + {_5BM_3})]$$
$$_3PM_3 = \text{MIN}[(_2PM_2 + {_6BM_3}), (_3PM_2 + {_7BM_3})]$$

In addition to the path metrics of Exp. (9), each of the trace vector values $_0TV_3$, $_1TV_3$, $_2TV_3$, $_3TV_3$ are stored and each of the confidence metric values $_0CM_3$, $_1CM_3$, $_2CM_3$, $_3CM_3$ are also stored. Note that for b=3, the trace vector value, $TV_3$, refers to bit decisions made about the first bit in the sequence. In general, the trace vector $TV_b$ refers to a tentative bit decision at a stage x–1 bits back from the current stage b. The processing continues in a like manner from b=3 to b=61.

For b=61, $$\overline{(b-1,b-2)} \quad (b) \qquad \text{Exp. (10)}$$

$$\overline{00} \quad 0 \quad _0BM_{61} = \sum_{\alpha=1}^{N_a} (^\alpha\beta_{r61} - {^\alpha_0}CT)^2$$

$$\overline{00} \quad 1 \quad _1BM_{61} = \sum_{\alpha=1}^{N_a} (^\alpha\beta_{r61} - {^\alpha_1}CT)^2$$

$$\overline{01} \quad 0 \quad _2BM_{61} = \sum_{\alpha=1}^{N_a} (^\alpha\beta_{r61} - {^\alpha_2}CT)^2$$

$$\overline{01} \quad 1 \quad _3BM_{61} = \sum_{\alpha=1}^{N_a} (^\alpha\beta_{r61} - {^\alpha_3}CT)^2$$

-continued $$_4BM_{61} = \sum_{a=1}^{N_a} (^a\beta_{r6l} - \tfrac{a}{4}CT)^2 \qquad \overline{10} \quad 0$$

$$_5BM_{61} = \sum_{a=1}^{N_a} (^a\beta_{r6l} - \tfrac{a}{5}CT)^2 \qquad \overline{10} \quad 1$$

$$_6BM_{61} = \sum_{a=1}^{N_a} (^a\beta_{r6l} - \tfrac{a}{6}CT)^2 \qquad \overline{11} \quad 0$$

$$_7BM_{61} = \sum_{a=1}^{N_a} (^a\beta_{r6l} - \tfrac{a}{7}CT)^2 \qquad \overline{11} \quad 1$$

$$_0PM_{61} = \text{MIN}[(_0PM_{60} + {_0BM_{61}}), ({_1PM_{60}} + {_1BM_{61}})] \qquad \text{Exp. (11)}$$
$$_1PM_{61} = \text{MIN}[(_2PM_{60} + {_2BM_{61}}), ({_3PM_{60}} + {_3BM_{61}})]$$
$$_2PM_{61} = \text{MIN}[(_0PM_{60} + {_4BM_{61}}), ({_1PM_{60}} + {_5BM_{61}})]$$
$$_3PM_{61} = \text{MIN}[(_2PM_{60} + {_6BM_{61}}), ({_3PM_{60}} + {_7BM_{61}})]$$

When the all the trace vectors, $TV_b$, for b=3, 4, . . . , 61 have been calculated, a reverse scan of the trace vectors is performed to determine the logical 1 or logical 0 values for each of the bits, b to form $\beta_{p61}$, $\beta_{p60}$, $\beta_{59}$, . . . , $\beta_{p2}$, $\beta_{p1}$.

Figures 20, 21:
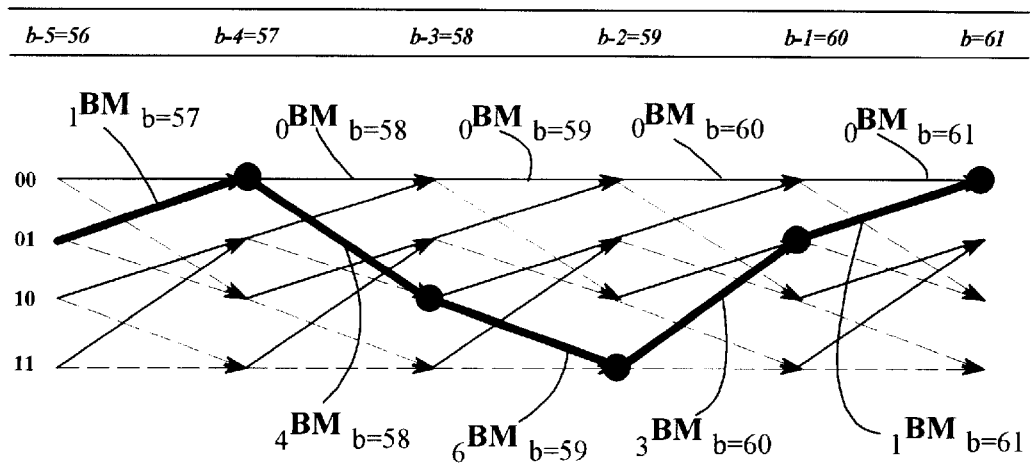
FIG. 20 depicts a view of the last six sequential stages of an MSLE trellis state diagram of the FIG. 16 type for bits 56, 57, 58, 59, 60 and 61.
FIG. 21 depicts the trace vector and confidence metric values resulting from a reverse scan.

Reverse Processing—FIGS. 20 and 21

Referring to FIG. 20, the bit values for b=61, 60, . . . , 59 are shown assuming the example of FIG. 17. It is further assumed for purposes of explanation that the last two bits, b=61 and b=60 are known to be 0's as described in connection with FIG. 15. Therefore, the determination is made for the next bit b=59 by referring to the trace vector value $_0TV_{61}$. As previously noted, the trace vector determined at each step b refers to a bit decision about the bit x−1 bits previous where in this example x=3. The reverse processing continues as indicated in FIG. 21 until b=3 and all the bit values have been determined for b=59, . . . , 1 for each state $k_D$ in the trace back, the winning predecessor state is determined by the value of the current trace vector, $_{kD}TV_b$, by the formula $k_{D(b-1)} = (2k_{Db}) \bmod 2^{x-1} + {_{kD}TV_b}$.

Figure 22:
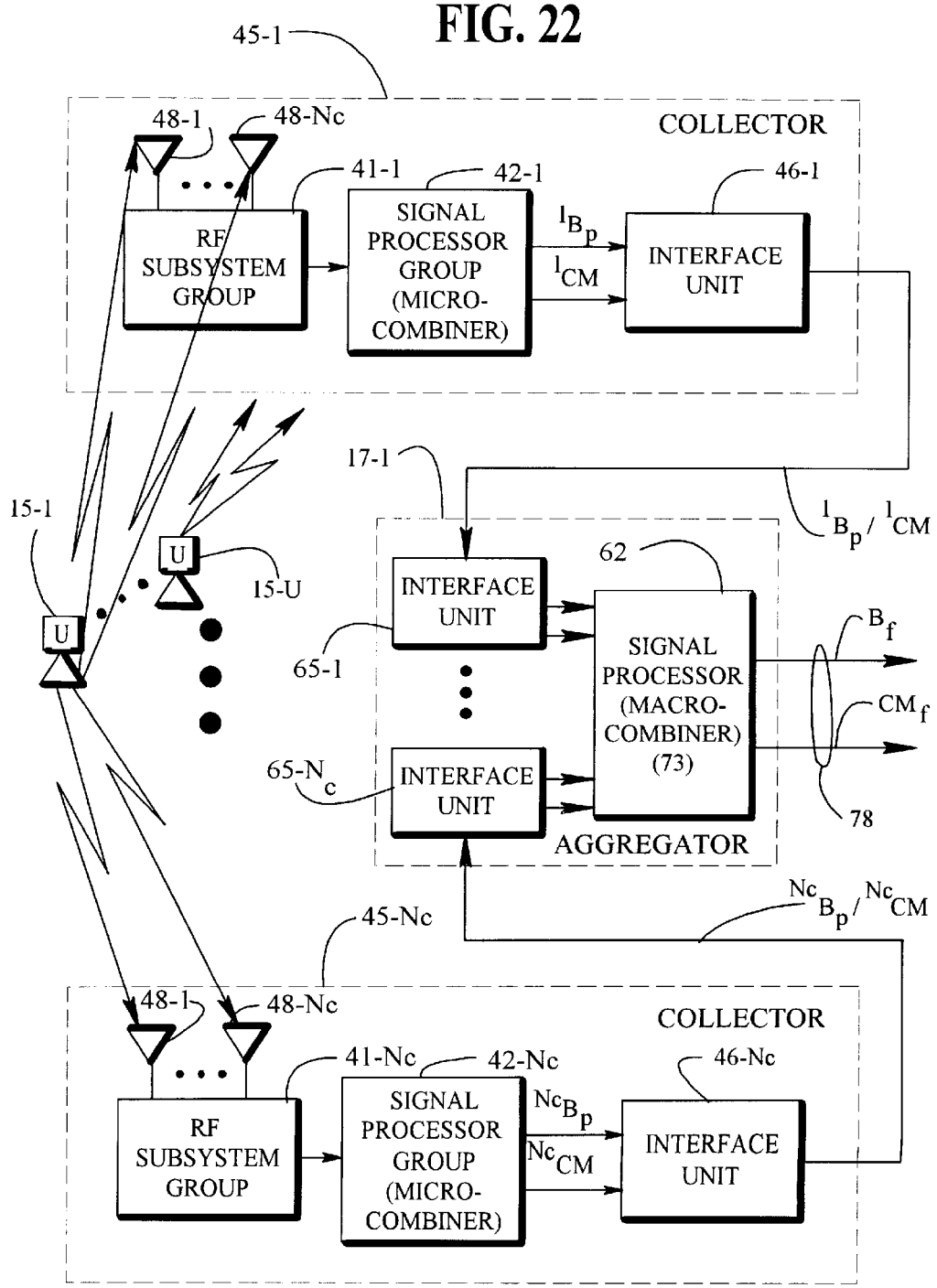
FIG. 22 depicts a representation of micro-diversity combining together with macro-diversity combining.

Micro-diversity and Macro-diversity Combination—FIG. 22

In FIG. 22, the micro-diversity and macro-diversity combining is represented in one block diagram as a summary of the FIGS. 11–14. In FIG. 22, the collectors 45-1, . . . , 45-$N_c$ are like those in FIG. 11. The N, collectors form $N_c$ different representations of the reverse channel communications from each one of a plurality of users, of which user 15-1 is typical, where each of those $N_c$ representations is produced as a result of micro-diversity combining in each of the signal processing groups 42-1, . . . , 42-$N_c$. The micro-diversity combining from the signal processing groups 42-1, . . . , 42-NC produces the data burst and confidence metric vector pairs [$^1B_p$; $^1CM$], . . . , [$^{Nc}B_p$; $^{Nc}CM$] which are forwarded by interface units 46-1, . . . , 46-$N_c$ to the interface units 65-1, . . . , 65-NC in the aggregator 17-1. The interface units 65-1, . . . , 65-$N_c$ in turn forward the data bursts and confidence metric vector pairs [$^1B_p$; $^1CM$], . . . , [$^{Nc}B_p$; $^{Nc}CM$] as inputs to the signal processor 62 for macro combining. The macro combined output is the final data burst $B_f$ and the final confidence metric vector $CM_f$.

Combining Based On Quality Metric

The aggregator 17-1 of FIG. 22 receives a plurality of bursts $^1B_p$, . . . , $^cB_p$, . . . , $^{Nc}B_p$, representing the reverse channel signals for the same particular one of the users 15-1, . . . , 15-U and combines them based on quality metrics. Each burst such as typical burst, $^cB_p$, includes data bits $^c\beta_{p1}$, $^c\beta_{p2}$, . . . , $^c\beta_{pb}$, . . . , $^c\beta_{pB}$, represented by confidence metric vector, $^cCM$, having confidence metrics, $^cCM_1$, $^cCM_2$, . . . , $^cCM_b$, . . . , $^cCM_B$. Each of the confidence metrics, such as typical confidence metric, $^cCM_b$, is in the form of a number, $^cc_p$, where $^cc_p$ is typically represented by two bytes of data and where $(-a) < {^cc_p} < (+a)$ and the amplitude a indicates the range for $^cc_p$. For $\gamma$ equal to the number of bits in the confidence metric, $a = 2^{\gamma-1}$. A large positive confidence metric value, $^cc_p$, indicates a high confidence that $^cc_p$ is a binary 1. A large negative confidence value for $^cC_p$ indicates a high confidence that $^cc_p$ is a binary 0. In the embodiment described, the logical 1 and logical 0 values are represented by the sign of $^cc_p$ where a positive sign is 1 and a negative sign is 0. More generally, the confidence metrics, $^cCM_1$, $^cCM_2$, . . . , $^cCM_b$, . . . , $^cCM_B$ are represented by the signed numbers $^cc_1$, $^cc_2$, . . . , $^cc_b$, . . . , $^cc_B$ for each of the B bits in a burst $^cB_p$.

In an embodiment where $N_c$ representations, $^1\beta_{pb}$, $^2\beta_{pb}$, . . . , $^{Nc}\beta_{pb}$, of each bit are generated with confidence metrics, $^1CM_b$, $^2CM_b$, . . . , $^{Nc}CM_b$ for each bit, each measured by numbers $^1c_b$, $^2c_b$, . . . , $^{Nc}c_b$, effectively, with each number $^\alpha c_b$ ranging between $(-a)$ and $(+a)$, the average aggregate confidence metric, $^{agg}c_b$ for each bit b is as follows:

$$^{agg}c_b = \frac{1}{N_c} \sum_{a=1}^{N_c} {^\alpha c_b} \qquad \text{Eq. (12)}$$

In an example where the number of collectors $N_c$ is equal to 3, the calculations for a single one of the bits b is as follows:

$$^{agg}c_b = \frac{1}{3}(^1c_b + {^2c_b} + {^3c_b}) \qquad \text{Eq. (13)}$$

The Eq. (13) confidence metric combining is useful where soft decision information is available for each bit of data as occurs for example with micro-diversity at a single collector having three spatially diverse antennas. Referring to the collector of FIG. 7, for example, the micro-diversity is achieved with three spatially diverse antennas 48-1, 48-2 and 48-3 where $N_c$=3. A numerical example is as follows:

$$a = 32768 \qquad \text{Eq. (14)}$$
$$^1c_b = -16931$$
$$^2c_b = -9285$$
$$^3c_b = 27308$$

Then, $$^{agg}c_b = \frac{1}{3}((-1693) + (-9285) + (27308)) = 364 \qquad \text{Eq. (15)}$$

In this example, although the negative values for confidence metrics $^1c_b$ and $^2c_b$ (for paths 1 and 2) indicate a 0 bit, confidence metric $^3c_b$ (for path 3) with a positive value indicates a 1 bit with a positive magnitude that is large enough to outweigh the negative magnitudes for confidence metrics $^1c_b$ and $^2c_b$.

In an embodiment where $N_c$ representations, $^1\beta_{pb}$, $^2\beta_{pb}$, ..., $^{Nc}\beta_{pb}$, of each bit are generated with confidence metrics, $^1CM_b$, $^2CM_b$, ..., $^{Nc}CM_b$, each measured by numbers $^1c_b$, $^2c_b$, ..., $^{Nc}c_b$, respectively, with each number $c_b$ ranging between (−a) and (+a) and with the weighting values, $^a w_b$ for each bit b, the average aggregate confidence metric, $^{agg}c_b$ for each bit b, is as follows:

$$^{agg}c_b = \frac{1}{N_c}\sum_{\alpha=1}^{N_c} {}^\alpha w_b {}^\alpha c_b \qquad \text{Eq. (16)}$$

While the invention has been particularly shown and described with reference to preferred embodiments thereof it will be understood by those skilled in the art that various changes in form and details may be made therein without departing from the spirit and scope of the invention.

What is claimed is:

1. A communication system having a plurality of channels comprising,
   a plurality of users for transmitting user signals in user channels,
   a plurality of macro-diverse collector means distributed at macro-diverse locations, each of said collector means including,
      collector receiver means including a plurality of micro-diversity receivers each for receiving said user signals and providing a plurality of micro-diverse received signals for each of said plurality of users,
      collector processing means for processing said micro-diverse received signals to form collector signals including for each of said plurality of users, sequences of data bits representing the microdiverse received signals and including confidence metrics corresponding to said data bits,
   aggregator means for combining said collector signals from said plurality of macro-diverse collector means for each of said plurality of users to form a final sequence of data bits representing the user signals for each of said plurality of users.

2. The communication system of claim 1 wherein said collector processing means includes a multi-sensor equalizer micro-combiner for processing said micro-diverse received signals.

3. A communication system having a plurality of channels comprising
   a plurality of users for transmitting user signals in user channels,
   a plurality of macro-diverse collector means distributed at macro-diverse locations, each of said collector means including,
      collector receiver mean including a plurality of micro-iversity receivers each for receiving said user signals and providing a plurality of micro-diverse received signals for each of said plurality of users,
      collector processing means for processing said micro-diverse received signals to form collector signals including, for each of said plurality of users, sequences of data bits representing the microdiverse received signals and including confidence metrics corresponding to said data bits and , wherein said collector processing means includes a micro-combiner having a plurality of single-sensor equalizers, one for each of said micro-diverse received signals, and a stage combiner for combining outputs from each of said single-sensor equalizers to form said collector signals,
   aggregator means for combining said collector signals from said plurality of macro-diverse collector means for each of said plurality of users to form a final sequence of data bits representing the user signals for each of said plurality of users.

4. A communication system having a plurality of channels comprising
   a plurality of users for transmitting user signals in user channels,
   a plurality of macro-diverse collector means distributed at macro-diverse locations, each of said collector means including,
      collector receiver means including a plurality of micro-diversity receivers wherein said user signals are processed to yield a sequence of received bursts, each for receiving said user signals and providing a plurality of micro-diverse received signals for each of said plurality of users,
      collector processing means for processing said micro-diverse received signals to form collector signals including, for each of said plurality of users, sequences of data bits representing the micro-diverse received signals and including confidence metrics corresponding to said data bits, and wherein said collector processor means uses soft maximum likelihood sequence estimates to form said confidence is metrics and wherein said collector processing means processes said received bursts having burst samples, $\beta_{rb}$, where b=1, 2, ..., B, based upon x-bit channel models where each channel model has taps, t, where t=0, 1, ..., T, where T=$2^x$−1, where there is one channel model for each of said user signals, and where each channel model is an estimate of an actual transmission channel for each of said user signals, respectively, with channel target values $_0CT$, $_1CT$, ..., $_tCT$, ..., $_TCT$,
   aggregator means for combining said collector signals from said plurality of macro diverse collector means for each of said plurality of users to form a final sequence of data bits representing the user signals for each of said plurality of users.

5. The communication system of claim 4 wherein said collector processor means operates based upon said received bursts and said channel target values and includes,
   means to generate branch metric values $_0BM_b$, $_1BM_b$, ..., $_tBM_b$, ..., $_TBM_b$,
   means to generate path metric values, $_0PM_b$, $_{PMb}$, ..., $_tPM_b$, ..., $_{(T+1)/2}PM_b$,
   means to generate trace vector values, $_0TV_b$, $_1TV_b$, $_{(T+1)/2}TV_b$,
   means to generate confidence metric values, $_0CM_b$, $_1CM_b$, ..., $_tCM_b$, ..., $_{(T+1)/2}CM_b$; and
   means to generate processed burst with burst bits, $\beta_{p1}$, $\beta_{p2}$, $\beta_3$, ..., $\beta_{pb}$, ..., $\beta_{pB}$.

6. The communication system of claim 5 wherein said collector processing means performs bit-by-bit processing for a current bit, b, for a once previous bit, b−1, for a twice previous bit, b−2, and so on up to a (b-(x−1)) bit for each received burst having burst samples, $\beta_{rb}$, where b=1, 2, ..., B, and the channel target values $_0CT$, $_1CT$, ..., $_1CT$, ..., $_T CT$, by determining the branch metric difference values, $_0 BM_{rb}, _1 BM_{rb}, \ldots, _T BM_{rb}$ as follows:

$$
\begin{array}{ccc}
\overline{(b-1, b-2)\ldots(b-(x-1))} & (b) & \\
\overline{00\ldots0} & 0 & _0 BM_b = (\beta_{rb} - _0 CT)^2 \\
\overline{00\ldots0} & 1 & _1 BM_b = (\beta_{rb} - _1 CT)^2 \\
\overline{00\ldots1} & 0 & _2 BM_b = (\beta_{rb} - _2 CT)^2 \\
\overline{00\ldots1} & 1 & _3 BM_b = (\beta_{rb} - _3 CT)^2 \\
& \vdots & \\
\overline{11\ldots0} & 0 & _{T-3} BM_b = (\beta_{rb} - _{T-3} CT)^2 \\
\overline{11\ldots0} & 1 & _{T-2} BM_b = (\beta_{rb} - _{T-2} CT)^2 \\
\overline{11\ldots1} & 0 & _{T-1} BM_b = (\beta_{rb} - _{T-1} CT)^2 \\
\overline{11\ldots1} & 1 & _T BM_b = (\beta_{rb} - _T CT)^2.
\end{array}
$$

7. The communication system of claim 5 wherein said collector processing means processes said received bursts having said burst samples, $\beta_{rb}$, as burst samples, $^\alpha\beta_{rb}$, where $b=1, 2, \ldots, B$, and $\alpha=1, 2, \ldots, N_a$ where $N_1$ is a number of diversity receivers based upon x-bit channel models where each channel model has taps, t, where $t=0, 1, \ldots, t, \ldots, T$, where $T=2^x-1$, where there are $N_a$ channel models, one for each of said user signals, and where each channel model is an estimate of an actual transmission channel for each of said user signals, respectively, with channel target values for each of the user signals $1, 2, \ldots, \alpha, \ldots, N_a$ as follows, $$
\begin{array}{c}
_0^1 CT, _1^1 CT, \ldots, _t^1 CT, \ldots, _T^1 CT \\
_0^2 CT, _1^2 CT, \ldots, _t^2 CT, \ldots, _T^2 CT \\
\vdots \\
_0^\alpha CT, _1^\alpha CT, \ldots, _t^\alpha CT, \ldots, _T^\alpha CT \\
\vdots \\
_0^{N_a} CT, _1^{N_a} CT, \ldots, _t^{N_a} CT, \ldots, _T^{N_a} CT
\end{array}
$$

and where the received bursts samples are as follows, $$
\begin{array}{c}
^1\beta_{r1}, ^1\beta_{r2}, ^1\beta_{r3}, \ldots, ^1\beta_{rb}, \ldots, ^1\beta_{rB} \\
^2\beta_{r1}, ^2\beta_{r2}, ^2\beta_{r3}, \ldots, ^2\beta_{rb}, \ldots, ^2\beta_{rB} \\
\vdots \\
^\alpha\beta_{r1}, ^\alpha\beta_{r2}, ^\alpha\beta_{r3}, \ldots, ^\alpha\beta_{rb}, \ldots, ^\alpha\beta_{rB} \\
\vdots \\
^{N_a}\beta_{r1}, ^{N_a}\beta_{r2}, ^{N_a}\beta_{r3}, \ldots, ^{N_a}\beta_{rb}, \ldots, ^{N_a}\beta_{rB}.
\end{array}
$$

8. The communication system of claim 7 wherein said collector processing means performs bit-by-bit processing for a current bit, b, for a once previous bit, b−1, for a twice previous bit, b−2, and so on up to a (b−(x−1)) bit for each received burst samples, $\beta_{rb}$, where $b=1, 2, \ldots, B$, and the channel target values $_0 CT, _1 CT, \ldots, _t CT, \ldots, _T CT$, by determining the branch metric difference values, $_0 BM_{rb}, _1 BM_{rb}, \ldots, _T BM_{rb}$ as follows:

$$
\begin{array}{ccc}
\overline{(b-1, b-2)\ldots(b-(x-1))} & (b) & \\
\overline{00\ldots0} & 0 & _0 BM_b = \sum_{\alpha=1}^{N_a} (^\alpha\beta_{rb} - _0^\alpha CT)^2 \\
\overline{00\ldots0} & 1 & _1 BM_b = \sum_{\alpha=1}^{N_a} (^\alpha\beta_{rb} - _1^\alpha CT)^2 \\
\overline{00\ldots1} & 0 & _2 BM_b = \sum_{\alpha=1}^{N_a} (^\alpha\beta_{rb} - _2^\alpha CT)^2 \\
\overline{00\ldots1} & 1 & _3 BM_b = \sum_{\alpha=1}^{N_a} (^\alpha\beta_{rb} - _3^\alpha CT)^2 \\
& \vdots & \\
\overline{11\ldots0} & 0 & _{T-3} BM_b = \sum_{\alpha=1}^{N_a} (^\alpha\beta_{rb} - _{T-3}^\alpha CT)^2 \\
\overline{11\ldots0} & 1 & _{T-2} BM_b = \sum_{\alpha=1}^{N_a} (^\alpha\beta_{rb} - _{T-2}^\alpha CT)^2 \\
\overline{11\ldots1} & 0 & _{T-1} BM_b = \sum_{\alpha=1}^{N_a} (^\alpha\beta_{rb} - _{T-1}^\alpha CT)^2 \\
\overline{11\ldots1} & 1 & _T BM_b = \sum_{\alpha=1}^{N_a} (^\alpha\beta_{rb} - _T^\alpha CT)^2
\end{array}
$$

9. The communication system of claim 8 wherein $N_a$ equals 2.

10. A communication system having a plurality of channels comprising,
  a plurality of users for transmitting user signals in user channels,
  a plurality of macrodiverse collector means distributed at macro-diverse locations, each of said collector means including,
    collector receiver means including a plurality of micro iversity receivers each for receiving said user signals and providing a plurality of micro-diverse received; signals for each of said plurality of users,
    collector processing means for processing said micro-diverse received signals to form collector signals including, for each of said plurality of users, sequences of data bits representing the microdiverse received signals and including confidence metrics corresponding to each bit of said sequences of data bits,
  aggregator means for combining said collects as from said plurality of macro-diverse collector means for each of said plurality of users to form a final sequence of data bits representing the user signals for each of said plurality of users and wherein said aggregator means receives, from $N_c$ of said collector means, $N_c$ macro-diverse collector signals each having a confidence metric value, $^\alpha c_b$ for each bit of said sequences of data bits and combines said confidence metric values to form an average confidence metric, $^{agg} c_b$, as follows:

$$^{agg} c_b = \frac{1}{N_c} \sum_{\alpha=1}^{N_c} {}^\alpha c_b.$$

11. A communication system having a plurality of channels comprising,
  a plurality of users for transmitting user signals in user channels, a plurality of macro-diverse collector means distributed at macro-diverse locations, each of said collector means including,
  collector receiver means including a plurality of microdiversity receivers each for receiving said user signals and providing a plurality of micro-diverse received signals for each of said plurality of users,
  collector processing means for processing said microdiverse received signals to form collector signals including, for each of said plurality of users, sequences of data bits representing the micro-diverse received signals and including confidence metrics corresponding to each bit of said sequences of data bits,
aggregator means for combining said collector signals from said plurality of macro-diverse collector means for each of said plurality of users to form a final sequence of data bits representing the user signals for each of said plurality of users and wherein said aggregator means receives, from $N_c$ of said collector means, $N_c$ macro-diverse collector signals each having a confidence metric value, $^\alpha c_b$, for each bit and each having a weighting factor, [<s]up$\alpha c_b$, for each bit of said sequences of data bits and combines said confidence metric values to form an average confidence metric, $^{agg}c_b$, as follows:

$$^{agg}c_b = \frac{1}{N_c}\sum_{\alpha=1}^{N_c} {}^\alpha w_b {}^\alpha c_b.$$

12. A communication system having a plurality of channels comprising,
  a plurality of users for transmitting user signals in user channels,
  a plurality of macro-diverse collector means distributed at macro-diverse locations, each of said collector means including,
    collector receiver means including a plurality of microdiversity receivers each form receiving said user signals and providing a plurality of micro-diverse received signals for each of said plurality of users,
    collector processing means for processing said microdiverse received signals to form collector signals including, for each of said plurality of users sequences of date bits representing the micro-diverse received signals and including confidences metrics corresponding to each bit of said sequences of data bits,
  aggregator means for combining said collector signals from said plurality of macro-diversity collector means for each of said plurality of users to form a final sequence of data bits is representing the user signals for each of said plurality of users, wherein said aggregator means combines said confidence metrics from two or more of said micro-diverse, collector signals for each of said plurality of users and forms a logical 1 or logical 0 value for each bit of said sequence of data bits based on combined confidence metrics and wherein each of said confidence metrics is in the form of a number, c, where (—a)<c<(+a) and where a is an amplitude represented by one or more bytes to indicate the range for c.

13. A communication system having a plurality of channels comprising a plurality of users for transmitting user signals in user channels,
  a plurality of macro-diverse collector means distributed at macro-diverse locations, each of said collector means including,
    collector receiver means including a plurality of microdiversity receivers each for receiving said user signals and providing a plurality of micro-diverse received signals for each of said plurality of users,
    collector processing means for processing said microdiverse received signals to form collector signals including, for each of said plurality of users, sequences of data bits representing the microdiverse received signals and including confidence metrics corresponding to said data bits, wherein said collector processing means includes signal measurement means for providing measurement signals measuring properties of the received user signals,
  aggregator means for combining said collector signals from said plurality of macro-diverse collector means for each of said plurality of users to form a final sequence of data bits representing the user signals for each of said plurality of users and wherein said aggregator means includes measurement processor means receiving said measurement signals for controlling which ones of said collector signals are combined.

14. The communication system of claim 13 wherein said signal measurement means determines power and said measurement signals represent the power of the received user signals.

15. The communication system of claim 14 wherein said collector processing means including channel model generation means for generating a channel model having an attenuation estimate of an actual transmission channel for each of said user signals, respectively, and said signal measurement means determines power as a function of said attenuation estimate.

16. The communication system of claim 1 wherein said aggregator means includes a signal processor having a macro-diversity combiner unit for combining said confidence metrics from two or more of said macro-diverse collector signals and forms a logical 1 or logical 0 value for each bit of said sequence of data bits based on combined confidence metrics.

17. The communication system of claim 16 wherein said signal processor includes a de-interleaver, a de-convolution unit and a block decoder.

18. A communication system having a plurality of channels comprising,
  a plurality of users for transmitting user signals in user channels,
  a plurality of macro-diverse collector means distributed at macro-diverse locations, each of said collector means including,
    collector receiver means including a plurality of micro-diversity receivers each for receiving said user signals and providing a plurality of micro-diverse received signals for each of said plurality of users,
    collector processing means for processing said microdiverse received signals to form collector signals including, for each of said plurality of users, sequences of data bits representing the micro-diverse received signals and including confidence metrics corresponding to said data bits,
  aggregator means for combining said collector signals from said plurality of macro-diverse collector means for each of said plurality of users to form a final sequence of data bits representing the user signals for each of said plurality of users and wherein said aggregator means includes an aggregator signal processor having, a plurality of macro-diversity combiner units each for combining said confidence metrics from two or more of said macro-diverse collector signals to form a logical 1 or logical 0 value for each bit of said sequence of data bits based on combined confidence metrics, first selector means for selecting different ones of the macro-diverse collector signals for inputs to different ones of the macro-diversity combiner units, second selector means for selecting one of the outputs from the macro-iversity combiner units to form said final sequence of data bits.

19. The communication system of claim 18 wherein said signal processor includes a macro-diversity combiner, a deinterleaver, a de-convolution unit and a block decoder.

20. A communication system having a plurality of channels comprising, a plurality of users for transmitting user signals in user channels, a plurality of macro-diverse collector means distributed at macro-diverse locations, each of said collector means including, collector receiver means including a plurality of micro-diversity receivers each for receiving said user signals and providing a plurality of micro-diverse received signals for each of said plurality of users, collector processing means for processing said microdiverse received signals to form collector signals including for each of said plurality of users, sequences of data bits representing the micro-diverse received signals and including confidence metrics corresponding to said data bits and, wherein said collector processing means includes signal measurement means for providing measurement signals measuring properties of the received user signals, aggregator means for combining said collector signals from said plurality of macro-diverse collector means for each of said plurality of users to form a final sequence of data bits representing the user signals for each of said plurality of users and wherein said aggregator means includes aggregator signal processor means including, measurement processor means receiving said measurement signals for providing measurement control signals for controlling which ones of said collector signals are combined, a plurality of macro-diversity combiner unit groups each for combining said confidence metrics from two or more of said macro-diverse collector signals to form a logical 1 or logical 0 value for each bit of said sequence of data bits based on said combined confidence metrics, each of said macro-diversity combiner unit groups including a macro-diversity combiner, a de-interleaver, a de-convolution unit and a block decoder for providing data outputs, first selector means responsive to said measurement control signals for selecting different ones of the macro-diverse collector signals for inputs to different ones of the macrodiversity combiner unit groups, second selector means for selecting one of said data outputs as said final sequence of data bits.

21. The communication system of claim 20 wherein said block decoder in each of said macro-diversity combiner unit groups provides a frame erasure signal and said second selector means selects one of said data outputs not associated with a frame erasure signal.

22. The communication system of claim 1 wherein each of said collector means further includes, control means for providing a collector time stamp for said collector signals.

23. The communication system of claim 22 wherein said aggregator means includes means for aligning collector signals from different ones of said collector means based on the time stamp received from each of said collector means.

24. A communication system having a plurality of forward channel communications and a plurality of corresponding reverse channel communications comprising, a plurality of users in a broadcaster zone, each of said users including user receiver means for receiving different user forward channel signals and including user transmitter means for broadcasting user reverse channel signals in a user reverse channel, said plurality of users providing a composite signal formed of a plurality of different user reverse channels, a plurality of macro-diverse collector means distributed in proximity to said broadcaster zone at macro-diverse locations, each of said collector means including, collector receiver means including a plurality of micro-diversity receivers each for receiving said user signals and providing a plurality of micro-diverse received signals for each of said plurality of users, collector processing means for processing said micro-diverse received signals to form collector signals including sequences of data bits representing the micro-diverse received signals and including confidence metrics corresponding to said data bits for each of said plurality of users, zone manager means including, broadcaster means including a broadcaster transmitter for broadcasting said plurality of user forward channel signals over a broadcaster range to said users in said broadcaster zone, aggregator means for combining said collector signals from said plurality of macrodiverse collector means for each of said plurality of users to form a final sequence of data bits representing the user signals for each of said plurality of users.

25. The communication system of claim 24 wherein said collector processing means includes a multi-sensor equalizer micro-combiner for processing said micro-diverse received signals.

26. The communication system of claim 24 wherein said collector processing means includes a micro-combiner having a plurality of single-sensor equalizers, one for each of said micro-diverse received signals, and a stage combiner for combining outputs from each of said single-sensor equalizers to form said collector signals.

27. The communication system of claim 24 wherein said user signals are processed to yield a sequence of received bursts and wherein said collector processor means uses soft maximum likelihood sequence estimates to form said confidence metrics.

28. The communication system of claim 27 wherein said collector processing means processes said received bursts where said received bursts have burst samples, $\beta_{rb}$, where b=1, 2, . . . , B, based upon x-bit channel models where each channel model has taps, t, where t=0, 1, . . . , T, where T=2 X−1, where there is one channel model for each of said user signals, and where each channel model is an estimate of an actual transmission channel for each of said user signals, respectively, with channel target values $_0CT$, $_1CT$, . . . , $_tCT$, . . . , $_TCT$.

29. The communication system of claim 28 wherein said collector processor means operates based upon said received bursts and said channel target values and includes, means to generate branch metric values $_0BM_b, _1BM_b, \ldots,$
$_tBM_b, \ldots, _TBM_b,$ means to generate path metric values, $_0PM_b, _1PM_b, \ldots,$
$_tPM_b, \ldots, _tPM_b, \ldots, _{(T+1)/2}PM_b,$ means to generate trace vector values, $_0TV_b, _1TV_b, \ldots$
$,_tTV_b, \ldots, _{(T+1)/2}TV_b,$ means to generate confidence metric values, $_0CM_b,$
$_1CM_b, \ldots, _tCM_b, \ldots, _{(T+1)/2}CM_b;$ and means to generate processed burst bits, $\beta_{p1}, \beta_{p2}, \beta_{p3}, \ldots, \beta_{pb}, \ldots, \beta_{pB}.$ 30. The communication system of claim 29 wherein said collector processing means performs bit-by-bit processing for a current bit, b, for a once previous bit, b−1, for a twice previous bit, b−2, and so on up to a (b−(x−1)) bit for each received burst sample, $\beta_{rb}$, where b=1, 2, ..., B, and the channel target values $_0CT, _1CT, \ldots, _tCT, \ldots, _TCT$, by determining the branch metric difference values, $_0BM_{rb}, _1BM_{rb}, \ldots, _TBM_{rb}$ as follows:

| $\overline{(b-1, b-2)\ldots(b-(x-1))}$ | (b) | |
|---|---|---|
| $\overline{00\ldots0}$ | 0 | $_0BM_b = (\beta_{rb} - {_0}CT)^2$ |
| $\overline{00\ldots0}$ | 1 | $_1BM_b = (\beta_{rb} - {_1}CT)^2$ |
| $\overline{00\ldots1}$ | 0 | $_2BM_b = (\beta_{rb} - {_2}CT)^2$ |
| $\overline{00\ldots1}$ | 1 | $_3BM_b = (\beta_{rb} - {_3}CT)^2$ |
| $\vdots$ | | |
| $\overline{11\ldots0}$ | 0 | $_{T-3}BM_b = (\beta_{rb} - {_{T-3}}CT)^2$ |
| $\overline{11\ldots0}$ | 1 | $_{T-2}BM_b = (\beta_{rb} - {_{T-2}}CT)^2$ |
| $\overline{11\ldots1}$ | 0 | $_{T-1}BM_b = (\beta_{rb} - {_{T-1}}CT)^2$ |
| $\overline{11\ldots1}$ | 1 | $_TBM_b = (\beta_{rb} - {_T}CT)^2.$ |

31. The communication system of claim 27 wherein said collector processing means processes said received bursts having burst bits, $^\alpha\beta_{rb}$, where b=1, 2, ..., B, and α=1, 2, ..., $N_a$ where Na is a number of diversity receivers based upon x-bit channel models where each channel model has taps, t, where t=0, 1, ..., t, ..., T, where T=$2^x$−1, where there are $N_a$ channel models, one for each of said user signals, and where each channel model is an estimate of an actual transmission channel for each of said user signals, respectively, with channel target values for each of the user signals 1, 2, ..., α, ..., $N_a$ as follows, $$_0^1CT, {_1^1}CT, \ldots, {_t^1}CT, \ldots, {_T^1}CT$$

$$_0^2CT, {_1^2}CT, \ldots, {_t^2}CT, \ldots, {_T^2}CT$$

$$\vdots$$

$$_0^\alpha CT, {_1^\alpha}CT, \ldots, {_t^\alpha}CT, \ldots, {_T^\alpha}CT$$

$$\vdots$$

$$_0^{Na}CT, {_1^{Na}}CT, \ldots, {_t^{Na}}CT, \ldots, {_T^{Na}}CT$$

and where the received burst samples are as follows, $$^1\beta_{r1}, {^1}\beta_{r2}, {^1}\beta_{r3}, \ldots, {^1}\beta_{rb}, \ldots, {^1}\beta_{rB}$$

$$^2\beta_{r1}, {^2}\beta_{r2}, {^2}\beta_{r3}, \ldots, {^2}\beta_{rb}, \ldots, {^2}\beta_{rB}$$

$$\vdots$$

-continued $$^\alpha\beta_{r1}, {^\alpha}\beta_{r2}, {^\alpha}\beta_{r3}, \ldots, {^\alpha}\beta_{rb}, \ldots, {^\alpha}\beta_{rB}$$

$$\vdots$$

$$^{Na}\beta_{r1}, {^{Na}}\beta_{r2}, {^{Na}}\beta_{r3}, \ldots, {^{Na}}\beta_{rb}, \ldots, {^{Na}}\beta_{rB}.$$

32. The communication system of claim 31 wherein said collector processing means performs bit-by-bit processing for a current bit, b, for a once previous bit, b−1, for a twice previous bit, b−2, and so on up to a (b−(x−1)) bit for each received burst samples, $\beta_{rb}$, where b=1, 2, ..., B, and the channel target values $_0CT, _1CT, \ldots, _tCT, \ldots, _TCT$, by determining the branch metric difference values, $_0BM_b, _1BM_{rb}, \ldots, _TBM_{rb}$ as follows:

| $\overline{(b-1, b-2)\ldots(b-(x-1))}$ | (b) | |
|---|---|---|
| $\overline{00\ldots0}$ | 0 | $_0BM_b = \sum_{\alpha=1}^{N_a} ({^\alpha}\beta_{rb} - {_0^\alpha}CT)^2$ |
| $\overline{00\ldots0}$ | 1 | $_1BM_b = \sum_{\alpha=1}^{N_a} ({^\alpha}\beta_{rb} - {_1^\alpha}CT)^2$ |
| $\overline{00\ldots1}$ | 0 | $_2BM_b = \sum_{\alpha=1}^{N_a} ({^\alpha}\beta_{rb} - {_2^\alpha}CT)^2$ |
| $\overline{00\ldots1}$ | 1 | $_3BM_b = \sum_{\alpha=1}^{N_a} ({^\alpha}\beta_{rb} - {_3^\alpha}CT)^2$ |
| $\vdots$ | | |
| $\overline{11\ldots0}$ | 0 | $_{T-3}BM_b = \sum_{\alpha=1}^{N_a} ({^\alpha}\beta_{rb} - {_{T-3}^\alpha}CT)^2$ |
| $\overline{11\ldots0}$ | 1 | $_{T-2}BM_b = \sum_{\alpha=1}^{N_a} ({^\alpha}\beta_{rb} - {_{T-2}^\alpha}CT)^2$ |
| $\overline{11\ldots1}$ | 0 | $_{T-1}BM_b = \sum_{\alpha=1}^{N_a} ({^\alpha}\beta_{rb} - {_{T-1}^\alpha}CT)^2$ |
| $\overline{11\ldots1}$ | 1 | $_TBM_b = \sum_{\alpha=1}^{N_a} ({^\alpha}\beta_{rb} - {_T^\alpha}CT)^2$ |

33. The communication system of claim 32 wherein $N_a$ equals 2.

34. The communication system of claim 24 wherein said aggregator means combines said confidence metrics from two or more of said micro-diverse collector signals for each of said plurality of users and forms a logical 1 or logical 0 value for each bit of said sequence of data bits based on combined confidence metrics.

35. The communication system of claim 34 wherein said aggregator means receives, from $N_c$ of said collector means, $N_c$ macro-diverse collector signals each having a confidence metric value, $^\alpha c_b$, for each bit and combines said confidence metric values to form an average confidence metric, $^{agg}c_b$, as follows:

$$^{agg}c_b = \frac{1}{N_c}\sum_{\alpha=1}^{N_c} {^\alpha}c_b.$$

36. The communication system of claim 34 wherein said aggregator means receives, from $N_c$ of said collector means, $N_c$ macro-diverse collector signals each having a confidence metric value, $^\alpha c_b$, for each bit and each having a weighting factor, $^\alpha w_b$, for each bit and combines said confidence metric values to form an average confidence metric, $^{agg}c_b,$ as follows:

$$^{agg}c_b = \frac{1}{N_c}\sum_{\alpha=1}^{N_c} {}^\alpha w_b {}^\alpha c_b.$$

37. The communication system of claim 34 wherein said confidence metric is in the form of a number, c, where (−a)<c<(+a) and where a is an amplitude represented by one or more bytes to indicate the range for c.

38. The communication system of claim 24 wherein,
said collector processing means includes signal measurement means for providing measurement signals measuring properties of the received user signals,
said aggregator means includes measurement processor means receiving said measurement signals for controlling which ones of said collector signals are combined.

39. The communication system of claim 38 wherein said signal measurement means measures power and said measurement signals represent the power of the received user signals.

40. The communication system of claim 24 wherein said aggregator means includes a signal processor having a macro-diversity combiner unit for combining said confidence metrics from two or mom of said macrodiverse collector signals and forms a logical 1 or logical 0 value for each bit of said sequence of data bits based on combined confidence metrics.

41. The communication system of claim 40 wherein said signal processor includes a de-interleaver, a de-convolution unit and a block decoder.

42. The communication system of claim 24 wherein said aggregator means includes an aggregator signal processor having,
a plurality of macro-diversity combiner units each for combining said confidence metrics from two or more of said macro-diverse collector signals to form a logical 1 or logical 0 value for each bit of said sequence of data bits based on combined confidence metrics,
first selector means for selecting different ones of the macro-diverse collector signals for inputs to different ones of the macro-diversity combiner units,
second selector means for selecting one of the outputs from the macro-diversity combiner units to form said final sequence of data bits.

43. The communication system of claim 42 wherein said signal processor includes a macro-diversity combiner, a de-interleaver, a de-convolution unit and a block decoder.

44. The communication system of claim 24 wherein,
said collector processing means includes signal measurement means for providing measurement signals measuring properties of the received user signals,
said aggregator means includes aggregator signal processor means including,
measurement processor means receiving said measurement signals for providing measurement control signals for controlling which ones of said collector signals are combined,
a plurality of macro-diversity combiner unit groups each for combining said confidence metrics from two or more of said macro-diverse collector signals to form a logical 1 or logical 0 value for each bit of said sequence of data bits based on said combined confidence metrics, each of said macro-diversity combiner unit groups including a macro-diversity combiner, a de-interleaver, a de-convolution unit and a block decoder for providing data outputs,
first selector means responsive to said measurement control signals for selecting different ones of the macro-diverse collector signals for inputs to different ones of the macro-diversity combiner unit groups,
second selector means for selecting one of said data outputs as said final sequence of data bits.

45. The communication system of claim 44 wherein said block decoder in each of said macro-diversity combiner unit groups provides a frame erasure signal and said second selector means selects one of said data outputs not associated with a frame erasure signal.

46. The communication system of claim 24 wherein each of said collector means further includes control means for providing a collector time stamp associated with said collector signals.

47. The communication system of claim 46 wherein said aggregator means includes means for aligning collector signals from different ones of said collector means based on the time stamp received from each of said collector means.

48. A communication system having a plurality of forward channel communications and a plurality of corresponding reverse channel communications comprising,
a plurality of users in a broadcaster zone,
each of said users including user receiver means for receiving different user forward channel signals and including user transmitter means for broadcasting user reverse channel signals in a user reverse channel,
said plurality of users providing a composite signal formed of a plurality of different user reverse channels,
a plurality of macro-diverse collector means distributed in proximity to said broadcaster zone at macro-diverse locations, each of said collector means including,
collector receiver means including a plurality of micro-diversity receivers each for receiving said user signals and providing a plurality of micro-diverse received signals for each of said plurality of users,
collector processing means for processing said micro-diverse received signals to form collector signals including sequences of data bits representing the micro-diverse received signals and including confidence metrics corresponding to said data bits for each of said plurality of users,
broadcaster means including a broadcaster transmitter for broadcasting said plurality of user forward channel signals over a broadcaster range to said users in said broadcaster zone,
control means for selecting ones of said plurality of collector means in a collector group for receiving reverse channel signals from particular ones of said plurality of users,
aggregator means for combining said collector signals from said plurality of macro-diverse collector means in said collector group for each of said particular ones of said plurality of users to form a final sequence of data bits representing the user signals for each of said particular ones of said plurality of users.

49. The communication system of claim 48 wherein said collector processing means includes a multi-sensor equalizer micro-combiner for processing said micro-diverse received signals.

50. The communication system of claim 48 wherein said collector processing means includes a micro-combiner having a plurality of single-sensor equalizers, one for each of said micro-diverse received signals, and a stage combiner for combining outputs from each of said single-sensor equalizers to form said collector signals.

51. The communication system of claim 48 further including a master time transmitter for transmitting a time synchronization signal and wherein each of said collector means further includes time control means responsive to said time synchronization signal for providing a collector time stamp associated with said collector signals.

52. The communication system of claim 51 wherein said aggregator means includes means for aligning collector signals from different ones of said collector means based on the time stamp received from each of said collector means.

53. A communication system having a plurality of forward channel communications and a plurality of corresponding reverse channel communications comprising,
a plurality of users in a plurality of broadcaster zones,
each of said users including user receiver means for receiving different user forward channel signals and including user transmitter means for broad- casting user reverse channel signals in a user reverse channel,
said plurality of users providing a composite signal formed of a plurality of different user reverse channels,
a number, $N_{bm}$, of broadcaster means, each including a broadcaster transmitter for broadcasting said plurality of user forward channel signals over a broadcaster range to said users in one of said broadcaster zones,
a number, $N_c$, of collector means distributed in proximity to said broadcaster zones at macro-diverse locations where the number $N_c$, of collector means is greater than the number, $N_{bm}$, of broadcaster means, each of said collector means including,
collector receiver means including a plurality of micro-diversity receivers each for receiving said composite signal and providing a plurality of micro-diverse received signals for each of ones of said plurality of users,
collector processing means for processing said micro-diverse received signals to form collector signals including sequences of data bits representing the micro-diverse received signals and including confidence metrics corresponding to said data bits for each of said ones of said plurality of users,
collector forwarding means for forwarding said sequences of data bits and said confidence metrics as collector signals for each of said ones of said plurality of users,
aggregator means for combining said macro-diverse collector signals for said each one of particular ones of the users from said collector means in said collector group to form a final sequence of data bits representing the user signals for said each one of particular ones of the users.

54. The communication system of claim 53 including control means for selecting ones of said plurality of collector means in a collector group for receiving reverse channel signals from particular ones of said plurality of users and wherein said aggregator means combines said collector signals from said plurality of macro-diverse collector means in said collector group for each of said particular ones of said plurality of users.

55. The communication system of claim 53 wherein said collector processing means includes a multi-sensor equalizer micro-combiner for processing said micro-diverse received signals.

56. The communication system of claim 53 wherein said collector processing means includes a micro-combiner having a plurality of single-sensor equalizers, one for each of said micro-diverse received signals, and a stage combiner for combining outputs from each of said single-sensor equalizers to form said collector signals.

57. The communication system of claim 53 further including a master time transmitter for transmitting a time synchronization signal and wherein each of said collector means further includes time control means responsive to said time synchronization signal for providing a collector time stamp associated with said collector signals.

58. The communication system of claim 57 wherein said aggregator means includes means for aligning collector signals from different ones of said collector means based on the time stamp received from each of said collector means.

59. The communication system of claim 1 wherein said user signals employ multiple access protocols.

60. The communication system of claim 59 wherein said user signals employ TDMA protocols.

61. The communication system of claim 59 wherein said user signals employ CDMA protocols.

62. The communication system of claim 59 wherein said user signals employ SDMA protocols.

63. A communication system having a plurality of forward channel communications and a plurality of corresponding reverse channel communications comprising,
a plurality of users in one or more broadcaster zones,
each of said users including user receiver means for receiving different user forward channel signals and including user transmitter means for broadcasting user reverse channel signals in a user reverse channel,
said plurality of users providing a composite signal formed of a plurality of different user reverse channels,
a plurality of macro-diverse collector means distributed in proximity to said broadcaster zones at macro-diverse locations, each of said collector means including,
collector receiver means including a plurality of micro-iversity receivers each for receiving said user signals and providing a plurality of micro-diverse received signals for each of said plurality of users,
collector processing means for processing said micro-diverse received signals to form collector signals including sequences of data bits representing the micro-diverse received signals and including confidence metrics corresponding to said data bits for each of said plurality of users,
a plurality of zone manager means, each including,
broadcaster means including a broadcaster transmitter for broadcasting said plurality of user forward channel signals over a broadcaster range to said users in said one or more broadcaster zones,
aggregator means for combining said collector signals from said plurality of macro-diverse collector means for each of said plurality of users to form a final sequence of data bits representing the user signals for each of said plurality of users.

64. The communication system of claim 63 including means for interconnecting said zone manager means.

65. The communication system of claim 64 including control means for controlling the selection of collector means and the broadcaster means for said plurality of users.

66. The communication system of claim 64 wherein said means for interconnecting said zone manager means is a region manager.

* * * * *